US012592755B2

(12) United States Patent
Cherian et al.

(10) Patent No.: US 12,592,755 B2
(45) Date of Patent: *Mar. 31, 2026

(54) COORDINATED BEAMFORMING (COBF) PROTOCOL FOR UNMANAGED NETWORKS

(71) Applicant: QUALCOMM Incorporated, San Diego, CA (US)

(72) Inventors: George Cherian, San Diego, CA (US); Yan Zhou, San Diego, CA (US); Alfred Asterjadhi, San Diego, CA (US); Abhishek Pramod Patil, San Diego, CA (US); Venkata Ramanan Venkatachalam Jayaraman, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,808

(22) Filed: Jun. 4, 2024

(65) Prior Publication Data

US 2024/0396604 A1 Nov. 28, 2024

Related U.S. Application Data

(63) Continuation of application No. 16/041,069, filed on Jul. 20, 2018, now Pat. No. 12,063,084.
(Continued)

(51) Int. Cl.
| | |
|---|---|
| *H04B 7/06* | (2006.01) |
| *H04B 7/024* | (2017.01) |
(Continued)

(52) U.S. Cl.
CPC ........... *H04B 7/0617* (2013.01); *H04B 7/024* (2013.01); *H04L 5/0035* (2013.01);
(Continued)

(58) Field of Classification Search
CPC . H04W 72/046; H04W 72/04; H04W 72/085; H04W 72/1284; H04W 72/082;
(Continued)

(56) References Cited

U.S. PATENT DOCUMENTS

| | | | |
|---|---|---|---|
| 2005/0141468 | A1 | 6/2005 | Kim et al. |
| 2007/0123254 | A1 | 5/2007 | Choi et al. |
(Continued)

FOREIGN PATENT DOCUMENTS

| | | |
|---|---|---|
| CN | 104904292 A | 9/2015 |
| WO | 2016040837 A1 | 3/2016 |

OTHER PUBLICATIONS

International Search Report and Written Opinion—PCT/US2018/043197—ISA/EPO—Feb. 13, 2019.
(Continued)

*Primary Examiner* — Un C Cho
*Assistant Examiner* — Rasha K Fayed
(74) *Attorney, Agent, or Firm* — Patterson + Sheridan, L.L.P.

(57) ABSTRACT

Certain aspects of the present disclosure are directed to apparatus and techniques for performing coordinated beamforming (CoBF) transmissions. The apparatus generally includes a processing system configured to generate at least one first frame including an invitation to share resources with one or more first wireless nodes, wherein the apparatus is part of a first basic service set and the one or more first wireless nodes are part of one or more second basic service sets, a first interface configured to output the at least one first frame for transmission to the one or more first wireless
(Continued)

nodes, and a second interface configured to obtain, from the one or more first wireless nodes, an identification of one or more second wireless nodes if the invitation is accepted, wherein the second interface is configured to obtain one or more transmissions from at least one of the one or more second wireless nodes.

19 Claims, 18 Drawing Sheets

Related U.S. Application Data

(60) Provisional application No. 62/549,334, filed on Aug. 23, 2017, provisional application No. 62/537,679, filed on Jul. 27, 2017.

(51) Int. Cl.
| | |
|---|---|
| *H04L 5/00* | (2006.01) |
| *H04W 72/044* | (2023.01) |
| *H04W 74/00* | (2009.01) |

(52) U.S. Cl.
CPC ......... *H04L 5/0051* (2013.01); *H04W 72/046* (2013.01); *H04W 74/002* (2013.01)

(58) Field of Classification Search
CPC ........... H04W 74/002; H04W 74/0816; H04W 74/0808; H04W 74/08; H04W 16/28; H04W 16/10; H04W 84/12; H04W 92/20; H04W 88/08; H04W 76/11; H04W 76/10; H04W 52/46; H04W 52/286; H04W 52/04; H04W 52/244; H04W 52/343; H04W 52/386; H04W 52/143; H04W 52/16; H04W 52/243; H04W 52/245; H04W 52/367; H04W 52/50; H04W 8/005; H04W 24/00; H04W 4/00; H04W 4/80; H04W 64/003; H04W 48/08; H04L 5/0051; H04L 5/0035; H04L 5/0055; H04L 5/0053; H04L 5/0057; H04L 5/00; H04B 7/0617; H04B 7/024; H04B 7/06; H04B 7/0408; H04B 7/0456; H04B 7/02; H04B 7/04; H04B 7/0452
See application file for complete search history.

(56) References Cited

U.S. PATENT DOCUMENTS

| | | | |
|---|---|---|---|
| 2009/0029691 A1 | 1/2009 | Shen et al. | |
| 2010/0039948 A1* | 2/2010 | Agrawal | H04W 72/541 |
| | | | 370/252 |
| 2010/0246419 A1 | 9/2010 | Batta et al. | |
| 2011/0041021 A1 | 2/2011 | Khoshnevis et al. | |
| 2011/0149886 A1* | 6/2011 | Xu | H04B 7/0628 |
| | | | 370/328 |
| 2011/0194423 A1 | 8/2011 | Cho et al. | |
| 2012/0120842 A1 | 5/2012 | Kim et al. | |

| | | | |
|---|---|---|---|
| 2012/0220327 A1* | 8/2012 | Lee | H04W 72/1273 |
| | | | 455/509 |
| 2013/0039386 A1 | 2/2013 | Zhou et al. | |
| 2013/0058310 A1 | 3/2013 | Park et al. | |
| 2013/0142071 A1 | 6/2013 | Liu | |
| 2013/0163530 A1* | 6/2013 | Chen | H04W 72/04 |
| | | | 370/329 |
| 2013/0178219 A1 | 7/2013 | Lee et al. | |
| 2013/0203453 A1 | 8/2013 | Kang | |
| 2013/0223253 A1* | 8/2013 | Enescu | H04B 7/024 |
| | | | 370/252 |
| 2013/0324117 A1 | 12/2013 | Kim et al. | |
| 2014/0050111 A1 | 2/2014 | Nagata et al. | |
| 2014/0301342 A1* | 10/2014 | She | H04W 52/40 |
| | | | 370/329 |
| 2014/0369341 A1 | 12/2014 | Jeong et al. | |
| 2015/0009951 A1 | 1/2015 | Josiam et al. | |
| 2015/0288427 A1* | 10/2015 | Wang | H04W 72/23 |
| | | | 370/329 |
| 2015/0288428 A1 | 10/2015 | Choi et al. | |
| 2016/0095069 A1* | 3/2016 | Noh | H04W 52/34 |
| | | | 455/452.1 |
| 2016/0127950 A1 | 5/2016 | Gupta et al. | |
| 2016/0128123 A1* | 5/2016 | Li | H04B 7/024 |
| | | | 370/252 |
| 2016/0278061 A1 | 9/2016 | Peng | |
| 2016/0286568 A1* | 9/2016 | Leroux | H04W 52/243 |
| 2016/0323853 A1 | 11/2016 | Kim et al. | |
| 2017/0006570 A1* | 1/2017 | Xu | H04W 56/0005 |
| 2017/0006613 A1* | 1/2017 | Kakishima | H04W 72/541 |
| 2017/0026853 A1 | 1/2017 | Aboul-Magd et al. | |
| 2017/0041925 A1 | 2/2017 | Yang et al. | |
| 2017/0055279 A1* | 2/2017 | Janis | H04W 72/542 |
| 2017/0141859 A1 | 5/2017 | Seo et al. | |
| 2017/0294949 A1* | 10/2017 | Zhang | H04J 11/0023 |
| 2017/0311290 A1 | 10/2017 | Adjakple et al. | |
| 2017/0332359 A1* | 11/2017 | Tsai | H04W 68/02 |
| 2017/0347312 A1 | 11/2017 | Kang et al. | |
| 2018/0027573 A1* | 1/2018 | Cariou | H04W 52/367 |
| | | | 370/329 |
| 2018/0206184 A1 | 7/2018 | Bahr et al. | |
| 2018/0220430 A1* | 8/2018 | Wikström | H04W 72/542 |
| 2018/0242226 A1* | 8/2018 | He | H04W 24/04 |
| 2018/0323883 A1* | 11/2018 | Fodor | H04W 64/00 |
| 2018/0343043 A1 | 11/2018 | Hakola et al. | |
| 2019/0036583 A1* | 1/2019 | Cherian | H04L 5/0035 |
| 2019/0089432 A1 | 3/2019 | Yang et al. | |
| 2019/0280837 A1* | 9/2019 | Sano | H04W 72/04 |
| 2019/0357093 A1* | 11/2019 | Xu | H04W 36/0044 |
| 2021/0090080 A1* | 3/2021 | Kang | G06Q 20/325 |

OTHER PUBLICATIONS

Ishihara K., et al., "Selective Beamforming for Inter-Cell Interference Mitigation in Coordinated Wireless LANs", 2013, 16th International Symposium on Wireless Personal Multimedia Communications (WPMC), NICT, Jun. 24, 2013 (Jun. 24, 2013), pp. 1-5, XP032493950, ISSN: 1347-6890 [retrieved on Oct. 2, 2013].
Partial International Search Report—PCT/US2018/043197—ISA/EPO—Oct. 26, 2018.
Taiwan Search Report—TW107125339—TIPO—Feb. 16, 2022.

* cited by examiner

600

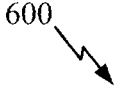

602

GENERATE AT LEAST ONE FIRST FRAME INCLUDING AN INVITATION TO SHARE RESOURCES WITH ONE OR MORE FIRST WIRELESS NODES, WHEREIN THE APPARATUS IS PART OF A FIRST BASIC SERVICE SET AND THE ONE OR MORE FIRST WIRELESS NODES ARE PART OF ONE OR MORE SECOND BASIC SERVICE SETS

604

OUTPUT THE AT LEAST ONE FIRST FRAME FOR TRANSMISSION TO THE ONE OR MORE FIRST WIRELESS NODES

606

OBTAIN, FROM THE ONE OR MORE FIRST WIRELESS NODES, AN IDENTIFICATION OF A ONE OR MORE SECOND WIRELESS NODES IF THE INVITATION IS ACCEPTED

608

OBTAIN ONE OR MORE TRANSMISSIONS FROM AT LEAST ONE OF THE ONE OR MORE SECOND WIRELESS NODES

FIG. 6

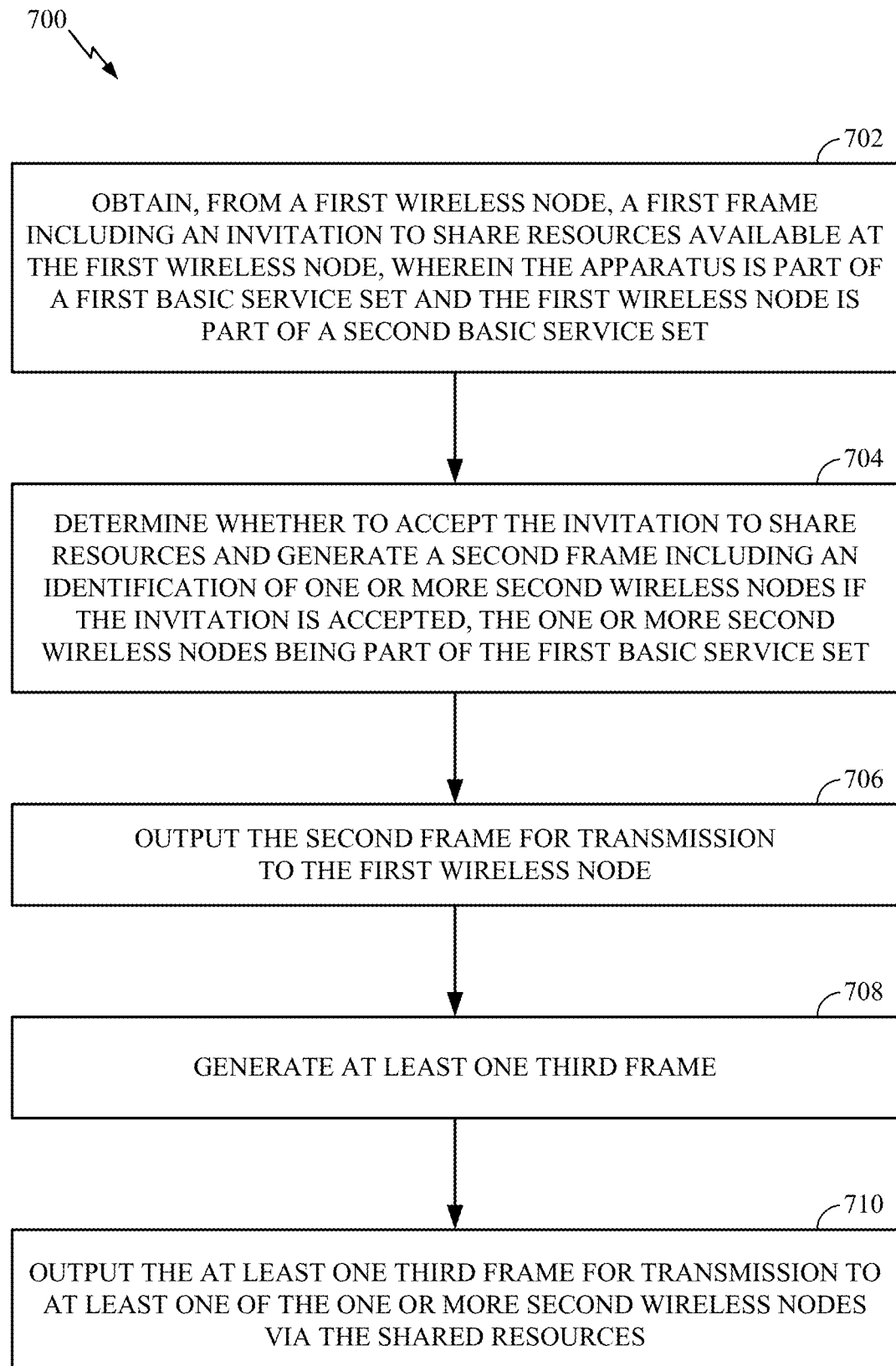

700

702

OBTAIN, FROM A FIRST WIRELESS NODE, A FIRST FRAME INCLUDING AN INVITATION TO SHARE RESOURCES AVAILABLE AT THE FIRST WIRELESS NODE, WHEREIN THE APPARATUS IS PART OF A FIRST BASIC SERVICE SET AND THE FIRST WIRELESS NODE IS PART OF A SECOND BASIC SERVICE SET

704

DETERMINE WHETHER TO ACCEPT THE INVITATION TO SHARE RESOURCES AND GENERATE A SECOND FRAME INCLUDING AN IDENTIFICATION OF ONE OR MORE SECOND WIRELESS NODES IF THE INVITATION IS ACCEPTED, THE ONE OR MORE SECOND WIRELESS NODES BEING PART OF THE FIRST BASIC SERVICE SET

706

OUTPUT THE SECOND FRAME FOR TRANSMISSION TO THE FIRST WIRELESS NODE

708

GENERATE AT LEAST ONE THIRD FRAME

710

OUTPUT THE AT LEAST ONE THIRD FRAME FOR TRANSMISSION TO AT LEAST ONE OF THE ONE OR MORE SECOND WIRELESS NODES VIA THE SHARED RESOURCES

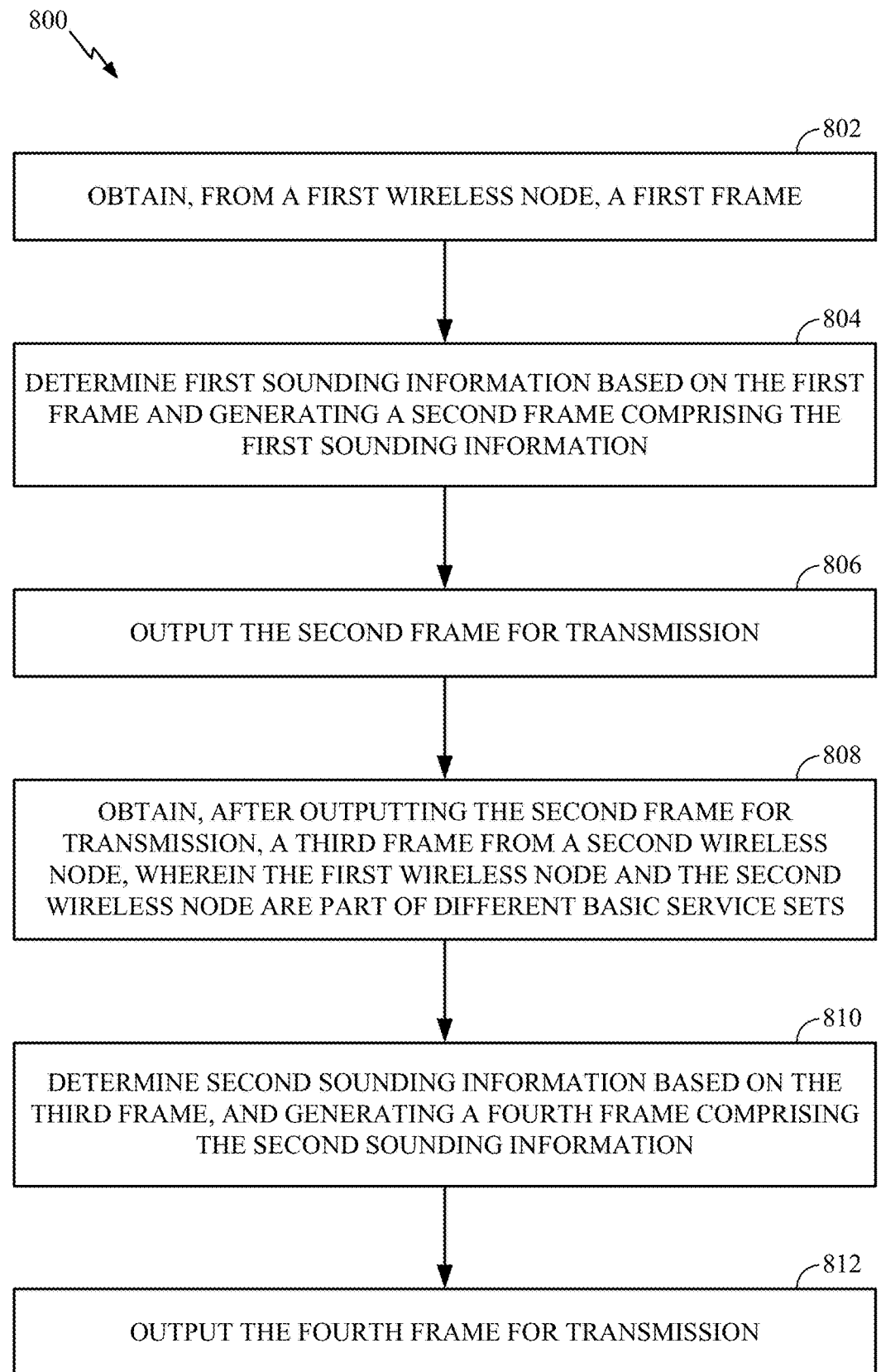

802

OBTAIN, FROM A FIRST WIRELESS NODE, A FIRST FRAME

804

DETERMINE FIRST SOUNDING INFORMATION BASED ON THE FIRST FRAME AND GENERATING A SECOND FRAME COMPRISING THE FIRST SOUNDING INFORMATION

806

OUTPUT THE SECOND FRAME FOR TRANSMISSION

808

OBTAIN, AFTER OUTPUTTING THE SECOND FRAME FOR TRANSMISSION, A THIRD FRAME FROM A SECOND WIRELESS NODE, WHEREIN THE FIRST WIRELESS NODE AND THE SECOND WIRELESS NODE ARE PART OF DIFFERENT BASIC SERVICE SETS

810

DETERMINE SECOND SOUNDING INFORMATION BASED ON THE THIRD FRAME, AND GENERATING A FOURTH FRAME COMPRISING THE SECOND SOUNDING INFORMATION

812

OUTPUT THE FOURTH FRAME FOR TRANSMISSION

FIG. 8

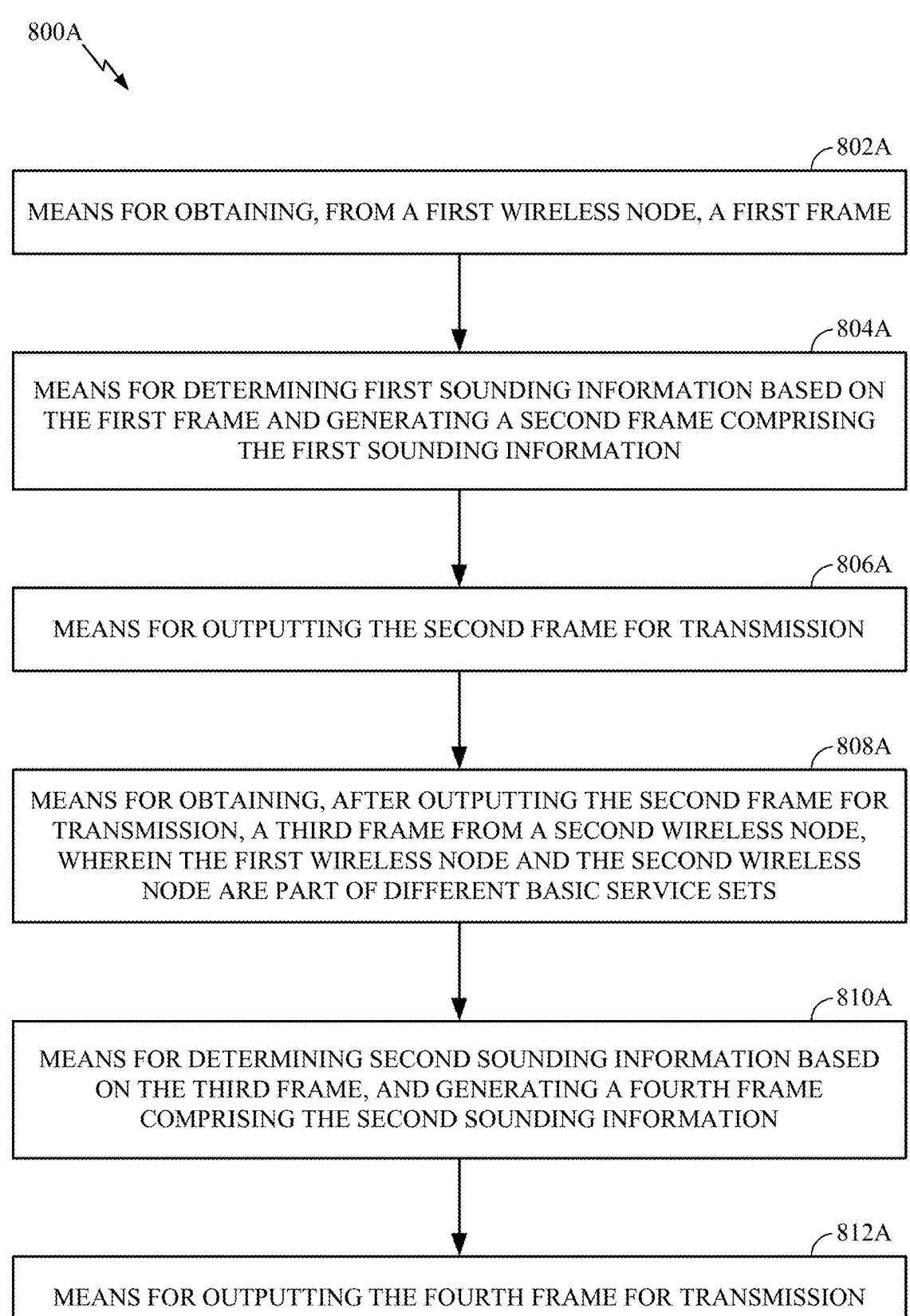

800A

802A

MEANS FOR OBTAINING, FROM A FIRST WIRELESS NODE, A FIRST FRAME

804A

MEANS FOR DETERMINING FIRST SOUNDING INFORMATION BASED ON THE FIRST FRAME AND GENERATING A SECOND FRAME COMPRISING THE FIRST SOUNDING INFORMATION

806A

MEANS FOR OUTPUTTING THE SECOND FRAME FOR TRANSMISSION

808A

MEANS FOR OBTAINING, AFTER OUTPUTTING THE SECOND FRAME FOR TRANSMISSION, A THIRD FRAME FROM A SECOND WIRELESS NODE, WHEREIN THE FIRST WIRELESS NODE AND THE SECOND WIRELESS NODE ARE PART OF DIFFERENT BASIC SERVICE SETS

810A

MEANS FOR DETERMINING SECOND SOUNDING INFORMATION BASED ON THE THIRD FRAME, AND GENERATING A FOURTH FRAME COMPRISING THE SECOND SOUNDING INFORMATION

812A

MEANS FOR OUTPUTTING THE FOURTH FRAME FOR TRANSMISSION

FIG. 8A

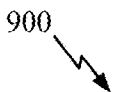
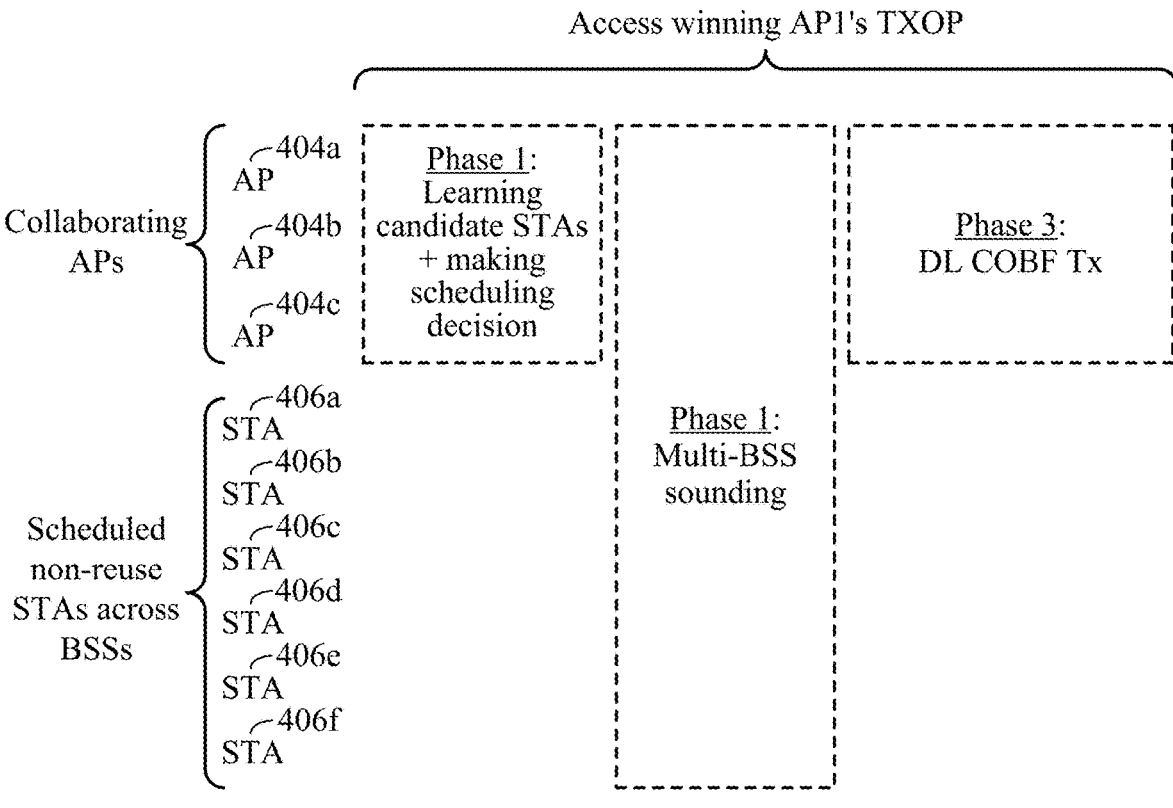
FIG. 9

FIG. 13

COORDINATED BEAMFORMING (COBF) PROTOCOL FOR UNMANAGED NETWORKS

CROSS-REFERENCE TO RELATED APPLICATIONS

This application is a continuation of U.S. Non Provisional patent application Ser. No. 16/041,069, which claims benefit of U.S. Provisional Patent Application Ser. No. 62/537,679, filed Jul. 27, 2017, and U.S. Provisional Patent Application Ser. No. 62/549,334, filed Aug. 23, 2017 which are expressly incorporated herein by reference in their entirety.

FIELD

Certain aspects of the present disclosure generally relate to wireless communications and, more particularly, to coordinated transmissions.

BACKGROUND

Beamforming operations may be used to direct the transmission of signals in a desired direction towards a receiver. For example, multiple antennas may be coordinated to form a coherent beam traveling in the desired direction. An electrical field may be rotated to change this direction. The resulting transmission is polarized based on the electrical field. A receiver may also include antennas which can match or adapt to changing transmission polarity.

SUMMARY

Certain aspects of the present disclosure are directed to an apparatus for wireless communication. The apparatus generally includes a processing system configured to generate at least one first frame including an invitation to share resources with one or more first wireless nodes, where the apparatus is part of a first basic service set and the one or more first wireless nodes are part of one or more second basic service sets, a first interface configured to output the at least one first frame for transmission to the one or more first wireless nodes, and a second interface configured to obtain, from the one or more first wireless nodes, an identification of one or more second wireless nodes if the invitation is accepted, where the second interface is configured to obtain one or more transmissions from at least one of the one or more second wireless nodes.

Certain aspects of the present disclosure are directed to an apparatus for wireless communication. The apparatus generally includes a first interface configured obtain, from a first wireless node, a first frame including an invitation to share resources available at the first wireless node, where the apparatus is part of a first basic service set and the first wireless node is part of a second basic service set, and a processing system configured to determine whether to accept the invitation to share resources and generate a second frame including an identification of one or more second wireless nodes if the invitation is accepted, the one or more second wireless nodes being part of the first basic service set, and a second interface configured to output the second frame for transmission to the first wireless node, where the processing system is configured to generate at least one third frame, and where the second interface is configured to output the at least one third frame for transmission to at least one of the one or more second wireless nodes via the shared resources.

Certain aspects of the present disclosure are directed an apparatus for wireless communication. The apparatus generally includes a first interface configured to obtain, from a first wireless node, a first frame, a processing system configured to determine first sounding information based on the first frame, and generate a second frame including the first sounding information, and a second interface configured to output the second frame for transmission, where: the first interface is configured to obtain, after outputting the second frame for transmission, a third frame from a second wireless node, where the first wireless node and the second wireless node are part of different basic service sets, the processing system is configured to determine second sounding information based on the third frame, and generate a fourth frame including the second sounding information, and the second interface is configured to output the fourth frame for transmission.

Certain aspects of the present disclosure are directed a method for wireless communication by an apparatus. The method generally includes generating at least one first frame including an invitation to share resources with one or more first wireless nodes, where the apparatus is part of a first basic service set and the one or more first wireless nodes are part of one or more second basic service sets, outputting the at least one first frame for transmission to the one or more first wireless nodes, obtaining, from the one or more first wireless nodes, an identification of one or more second wireless nodes if the invitation is accepted, and obtaining one or more transmissions from at least one of the one or more second wireless nodes.

Certain aspects of the present disclosure are directed a method for wireless communication by an apparatus. The method generally includes obtaining, from a first wireless node, a first frame including an invitation to share resources available at the first wireless node, where the apparatus is part of a first basic service set and the first wireless node is part of a second basic service set, determining whether to accept the invitation to share resources and generate a second frame including an identification of one or more second wireless nodes if the invitation is accepted, the one or more second wireless nodes being part of the first basic service set, outputting the second frame for transmission to the first wireless node, generating at least one third frame, and outputting the at least one third frame for transmission to at least one of the one or more second wireless nodes via the shared resources.

Certain aspects of the present disclosure are directed a method for wireless communication by an apparatus. The method generally includes obtaining, from a first wireless node, a first frame, determining first sounding information based on the first frame, and generate a second frame including the first sounding information, outputting the second frame for transmission, obtaining, after outputting the second frame for transmission, a third frame from a second wireless node, where the first wireless node and the second wireless node are part of different basic service sets, determining second sounding information based on the third frame, generating a fourth frame including the second sounding information, and outputting the fourth frame for transmission.

Certain aspects of the present disclosure are directed an apparatus for wireless communication. The apparatus generally includes means for generating at least one first frame including an invitation to share resources with one or more first wireless nodes, where the apparatus is part of a first basic service set and the one or more first wireless nodes are part of one or more second basic service sets, means for outputting the at least one first frame for transmission to the one or more first wireless nodes, means for obtaining, from the one or more first wireless nodes, an identification of one or more second wireless nodes if the invitation is accepted, and means for obtaining one or more transmissions from at least one of the one or more second wireless nodes.

Certain aspects of the present disclosure are directed an apparatus for wireless communication. The apparatus generally includes means for obtaining, from a first wireless node, a first frame including an invitation to share resources available at the first wireless node, where the apparatus is part of a first basic service set and the first wireless node is part of a second basic service set, means for determining whether to accept the invitation to share resources and generate a second frame including an identification of one or more second wireless nodes if the invitation is accepted, the one or more second wireless nodes being part of the first basic service set, means for outputting the second frame for transmission to the first wireless node, means for generating at least one third frame, and means for outputting the at least one third frame for transmission to at least one of the one or more second wireless nodes via the shared resources.

Certain aspects of the present disclosure are directed an apparatus for wireless communication. The apparatus generally includes means for obtaining, from a first wireless node, a first frame, means for determining first sounding information based on the first frame, and generate a second frame including the first sounding information, means for outputting the second frame for transmission, means for obtaining, after outputting the second frame for transmission, a third frame from a second wireless node, where the first wireless node and the second wireless node are part of different basic service sets, means for determining second sounding information based on the third frame, means for generating a fourth frame including the second sounding information, and means for outputting the fourth frame for transmission.

Certain aspects of the present disclosure generally includes a computer-readable medium having instructions stored thereon to cause an apparatus to: generate at least one first frame including an invitation to share resources with one or more first wireless nodes, where the apparatus is part of a first basic service set and the one or more first wireless nodes are part of one or more second basic service sets, output the at least one first frame for transmission to the one or more first wireless nodes, obtain, from the one or more first wireless nodes, an identification of one or more second wireless nodes if the invitation is accepted, and obtain one or more transmissions from at least one of the one or more second wireless nodes.

Certain aspects of the present disclosure generally includes a computer-readable medium having instructions stored thereon to cause an apparatus to: obtain, from a first wireless node, a first frame including an invitation to share resources available at the first wireless node, where the apparatus is part of a first basic service set and the first wireless node is part of a second basic service set, determine whether to accept the invitation to share resources and generate a second frame including an identification of one or more second wireless nodes if the invitation is accepted, the one or more second wireless nodes being part of the first basic service set, output the second frame for transmission to the first wireless node, generate at least one third frame, and output the at least one third frame for transmission to at least one of the one or more second wireless nodes via the shared resources.

Certain aspects of the present disclosure generally includes a computer-readable medium having instructions stored thereon to cause an apparatus to: obtain, from a first wireless node, a first frame, determine first sounding information based on the first frame, and generate a second frame including the first sounding information, output the second frame for transmission, obtain, after outputting the second frame for transmission, a third frame from a second wireless node, where the first wireless node and the second wireless node are part of different basic service sets, determine second sounding information based on the third frame, generate a fourth frame including the second sounding information, and output the fourth frame for transmission.

Certain aspects of the present disclosure generally includes a first wireless node comprising a processing system configured to generate at least one first frame including an invitation to share resources with one or more second wireless nodes, wherein the first wireless node is part of a first basic service set and the one or more second wireless nodes are part of one or more second basic service sets, a transmitter configured to transmit the at least one first frame to the one or more second wireless nodes, and a receiver configured to receive, from the one or more second wireless nodes, an identification of one or more third wireless nodes if the invitation is accepted, wherein the receiver is configured to obtain one or more transmissions from at least one of the one or more third wireless nodes.

Certain aspects of the present disclosure generally includes a first wireless node comprising a receiver configured to receive, from a second wireless node, a first frame including an invitation to share resources available at the second wireless node, wherein the first wireless node is part of a first basic service set and the second wireless node is part of a second basic service set, and a processing system configured to determine whether to accept the invitation to share resources and generate a second frame including an identification of one or more third wireless nodes if the invitation is accepted, the one or more third wireless nodes being part of the first basic service set, and a transmitter configured to transmit the second frame to the second wireless node, wherein the processing system is configured to generate at least one third frame, and wherein the transmitter is configured to transmit the at least one third frame to at least one of the one or more third wireless nodes via the shared resources.

Certain aspects of the present disclosure generally includes a first wireless node comprising a receiver configured to receive, from a second wireless node, a first frame, a processing system configured to determine first sounding information based on the first frame, and generate a second frame comprising the first sounding information, and a transmitter configured to transmit the second frame, wherein the receiver is further configured to obtain, after transmitting the second frame, a third frame from a third wireless node, wherein the second wireless node and the third wireless node are part of different basic service sets, the processing system is further configured to determine second sounding information based on the third frame, and generate a fourth frame comprising the second sounding information, and the transmitter is further configured to transmit the fourth frame.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 is a flow diagram of example operations for wireless communication, in accordance with certain aspects of the present disclosure

FIG. 7 is a flow diagram of example operations for wireless communication, in accordance with certain aspects of the present disclosure.

FIG. 8 is a flow diagram of example operations for wireless communication, in accordance with certain aspects of the present disclosure FIG. 8A illustrates example components capable of performing the operations shown in FIG. 8.

FIG. 9 illustrates multiple phases of an example CoBF protocol, in accordance with certain aspects of the present disclosure.

FIG. 13 illustrates an example communication protocol, in accordance with certain aspects of the present disclosure.

DETAILED DESCRIPTION

Figure 1:
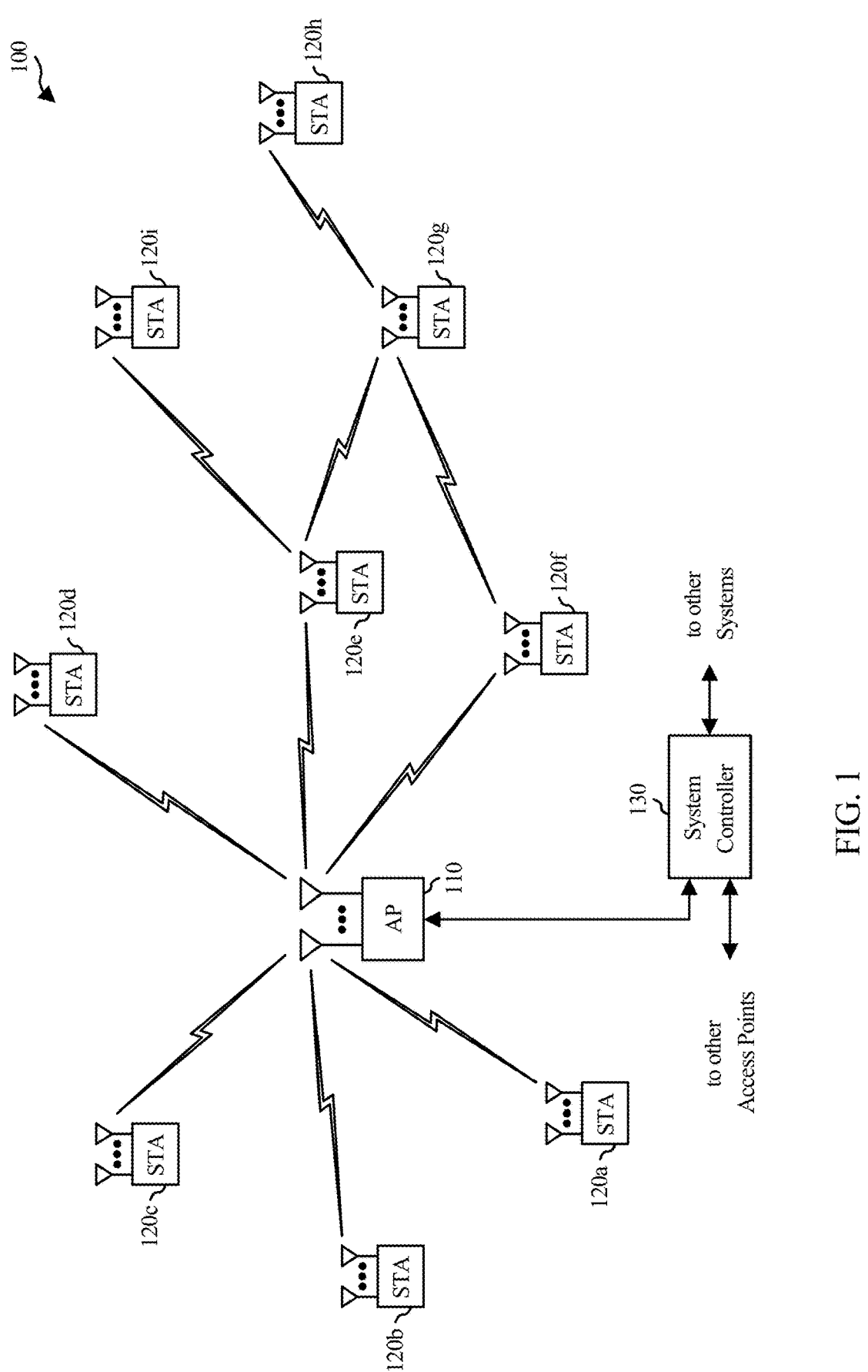
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a station.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a station, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a system 100 in which aspects of the disclosure may be performed. The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more stations 120 at any given moment on the downlink and uplink. The downlink (i.e., forward link) is the communication link from the access point to the stations, and the uplink (i.e., reverse link) is the communication link from the stations to the access point. A station may also communicate peer-to-peer with another station.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe stations 120 capable of communicating via Spatial Division Multiple Access (SDMA), for certain aspects, the stations 120 may also include some STA that do not support SDMA. Thus, for such aspects, an access point 110 may be configured to communicate with both SDMA and non-SDMA stations. This approach may conveniently allow older versions of stations ("legacy" stations) to remain deployed in an enterprise, extending their useful lifetime, while allowing newer SDMA stations to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected stations 120 collectively represents the multiple-output for downlink transmissions and the multiple-input for uplink transmissions. For pure SDMA, it is desired to have $N_{ap} \geq K \geq 1$ if the data symbol streams for the K stations are not multiplexed in code, frequency or time by some means. K may be greater than $N_{ap}$ if the data symbol streams can be multiplexed using TDMA technique, different code channels with code division multiple access (CDMA), disjoint sets of subbands with OFDM, and so on. Each selected STA transmits user-specific data to and/or receives user-specific data from the access point. In general, each selected STA may be equipped with one or multiple antennas $$(\text{i.e., } N_{ut} \geq 1).$$

The K selected stations can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the stations 120 share the same frequency channel by dividing transmission/reception into different time slots, each time slot being assigned to different stations 120.

Figure 2:
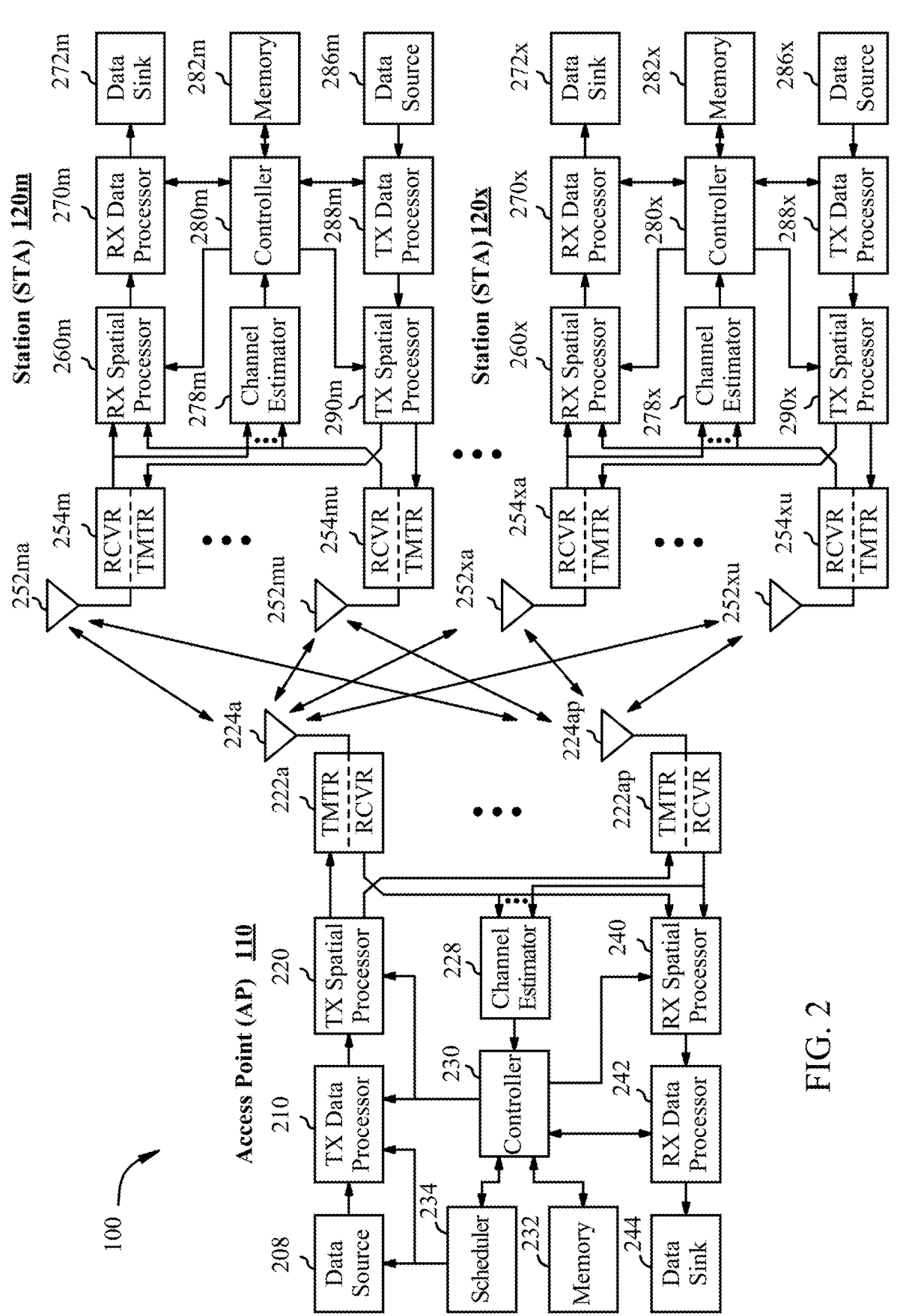
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 6-8 and 6A, 7A, and 8A.

FIG. 2 illustrates a block diagram of access point 110 two stations 120m and 120x in a MIMO system 100. The access point 110 is equipped with $N_t$ antennas 224a through 224ap. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup STA are selected for simultaneous transmission on the uplink, Ndn stations are selected for simultaneous transmission on the downlink, Nup may or may not be equal to Ndn, and Nup and Ndn may be static values or can change for each scheduling interval. The beam-steering or some other spatial processing technique may be used at the access point and station.

On the uplink, at each station 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup stations may be scheduled for simultaneous transmission on the uplink. Each of these stations performs spatial processing on its data symbol stream and transmits its set of transmit symbol streams on the uplink to the access point.

At access point 110, $N_{ap}$ antennas 224a through 224ap receive the uplink signals from all Nup stations transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for Ndn stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides Ndn downlink data symbol streams for the Ndn stations. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the stations. The decoded data for each STA may be provided to a data sink 272 for storage and/or a controller 280 for further processing.

At each station 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the station.

At each station 120, a channel estimator 278 estimates the downlink channel response and provides downlink channel estimates, which may include channel gain estimates, signal-to-noise ratio (SNR) estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix Hdn,m for that STA. Controller 230 derives the spatial filter matrix for the access point based on the effective uplink channel response matrix Hup,eff. Controller 280 for each STA may send feedback information (e.g., the downlink and/or uplink eigenvectors, eigenvalues, SNR estimates, and so on) to the access point.

Controllers 230 and 280 also control the operation of various processing units at access point 110 and station 120, respectively.

Figure 3:
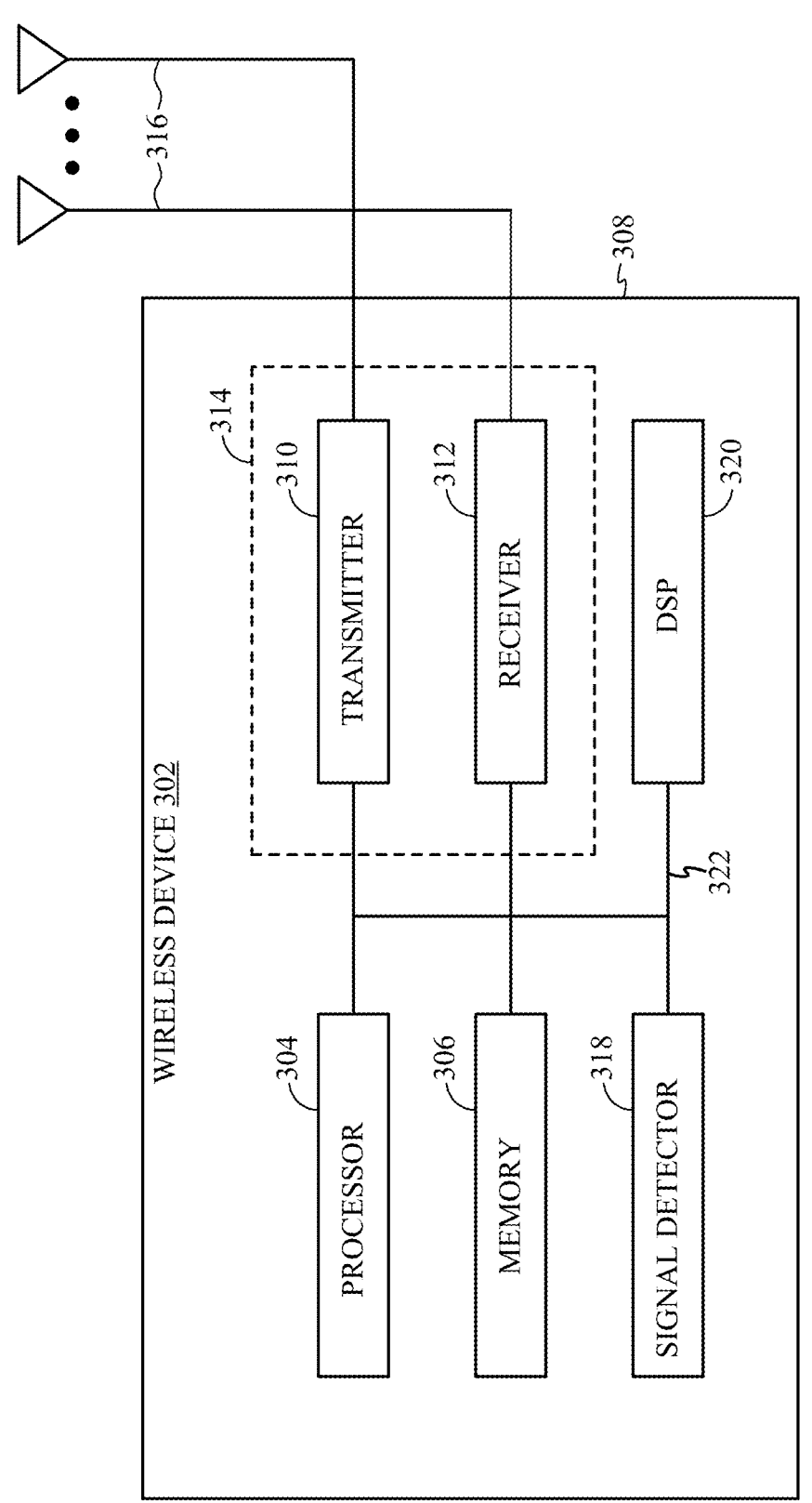
FIG. 3 illustrates an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 600, 700, and 800. The wireless device 302 may be an access point 110 or a station 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Coordinated Beamforming (Cobf) Protocol

Multiple stations may belong to different basic service sets (BSSs) and be associated with different access points (APs). The different BSSs may be within communication range of each other such that communications between APs and stations (STAs) of the different BSSs may interfere with each other. Certain aspects of the present disclosure provide techniques for performing coordinated beamforming (CoBF) allowing multiple BSSs to carry out simultaneous transmissions during the same transmit opportunity (TXOP).

Figure 4A:
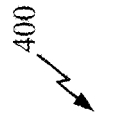
FIG. 4A illustrates a communication system for implementing coordinated beamforming (CoBF), in accordance with certain aspects of the present disclosure.

FIG. 4A illustrates a communication system 400 having four basic service sets (BSSs) 402a-d, each BSS including an access point 104a-d respectively. As illustrated, STAs 406a and 406b may be associated with AP 404a in BSS 402a. Each of the APs may identify re-use and non-reuse STAs in its own BSS. A reuse STA may refer to a STA that can be scheduled in a CoBF TXOP without being nulled by other participating AP. In otherwords, a reuse STA (e.g., STA 406a) may be positioned such that a downlink (DL) transmission from its own AP (e.g., AP 404a) does not cause interference with DL transmissions in other BSSs. On the other hand, a non-reuse STA is a STA (e.g., STA 406b) that is positioned such that a DL transmission from its own AP (e.g., AP 404a) causes interference with DL transmissions in other BSSs. Non-reuse STAs may be scheduled in a CoBF TXOP with nulling to avoid interfering with transmission from other APs participating in that TXOP.

Each AP 404a-d is associated with at least two STAs within its respective BSS 402a-d. AP 404a is associated with STA 406a-b. AP 404b is associated with STA 406c-d. AP 404c is associated with STA 406c-f. AP 404d is associated with STAs 406g-h. An AP that is associated with a STA may be referred to as a BSS AP for the STA. Similarly, an AP for which there is no association with a particular STA may be referred to as an OBSS AP for the STA. Associations between an AP and one or more STAs provides for, in part, coordination of communication between devices within the BSS defined by the AP and its associated STAs. For example, devices within each BSS may exchange signals with each other. The signals may function to coordinate transmissions from the respective AP and stations within the AP's BSS.

The devices shown in FIG. 4A, including the AP's 404a-d and STA 406a-h, also share a wireless medium. Sharing of the wireless medium is facilitated, in certain aspects, via the use of carrier sense media access with collision detection (CSMA/CD). The disclosed aspects herein may provide for a modified version of CSMA/CD that provides for an increase in an ability for the BSSs 402a-d to communicate simultaneously when compared to known systems.

The STAs 406a-h within the BSSs 402a-d may have different abilities to receive transmissions from their associated APs based, at least in part, on their position relative to the other APs 404a-d and/or STAs outside their respective BSS. For example, because the STAs 406a, 406d, 406c, and 406h (e.g., reuse STAs) are positioned relatively far from OBSS APs, these stations may have an ability to receive transmissions from their respective BSS AP even when an OBSS AP or STA is transmitting, as previously described. Reuse STAs may have sufficient signal to noise ratios (SINRs) with OBSS APs that they may communicate with other STAs and/or APs without having to be nulled.

In contrast, STAs 106b, 106c, 106f, and 106g (e.g., non-reuse STAs) are illustrated in positions that are relatively close to an OBSS AP. Thus, these stations may have less ability to receive transmissions from their BSS AP during transmissions from OBSS AP's and/or OBSS STAs, as previously described. Non-reuse STAs may have insufficient signal to noise ratios (SINRs) with OBSS APs that they may be nulled in order to communicate with other STAs and/or APs while communications are occurring involving the OBSS APs. In certain aspects, the disclosed methods and systems may provide for an improved ability for the non-reuse STAs to communicate concurrently while other OBSS devices are also communicating on the wireless medium.

In at least some of the disclosed aspects, two or more of the APs 404a-d may negotiate to form a cluster of APs. In other aspects, cluster configurations may be defined via manual configuration. For example, each AP may maintain configuration parameters indicating whether the AP is part of one or more cluster, and if so, a cluster identifier for the cluster. In some aspects, the configuration may also indicate whether the AP is a cluster controller for the cluster. In certain aspects, a cluster controller may take on functions that differ from APs that are part of the cluster but are not a cluster controller. Thus, in some aspects, two or more of APs 404a-d may be included in the same cluster. STAs associated with those APs may also be considered to be included in or part of the cluster of their associated AP. Therefore, in some aspects, the STAs a-h illustrated above may be part of the same cluster.

The cluster of APs may coordinate transmissions between themselves and their associated APs. In some aspects, the cluster may be identified via a cluster identifier that uniquely identifies the group of APs comprising the cluster. In some aspects, during association of a STA with any of the APs in a cluster, the cluster identifier is transmitted to the station during association, for example, in an association response message. The STA may then use the cluster identifier to coordinate communications within the cluster. For example, one or more messages transmitted over the wireless network may include the cluster identifier, which a receiving STA may use to determine whether the message is addressed to it or not.

In certain aspects, APs may also use various methods to identify STAs within the cluster. For example, where a technique used to generate association identifiers (AIDs) does not provide uniqueness across APs, media access control (MAC) addresses may be used to identify STAs where appropriate. For example, messages including user info fields that use AIDs to identify STAs may be modified to contain data derived from STA MAC addresses. Alternatively, methods of generating association identifiers may be modified to ensure uniqueness within a cluster of access points. For example, a portion of the AID may uniquely identify an AP within the cluster. STAs associated with that AP would be assigned AIDs including the unique identification. This provides unique AIDs across APs within a cluster. In some other aspects, an AID within a cluster may include the cluster identifier. This may provide for uniqueness across clusters to facilitate future cross-cluster coordination of communication.

Figure 4B:
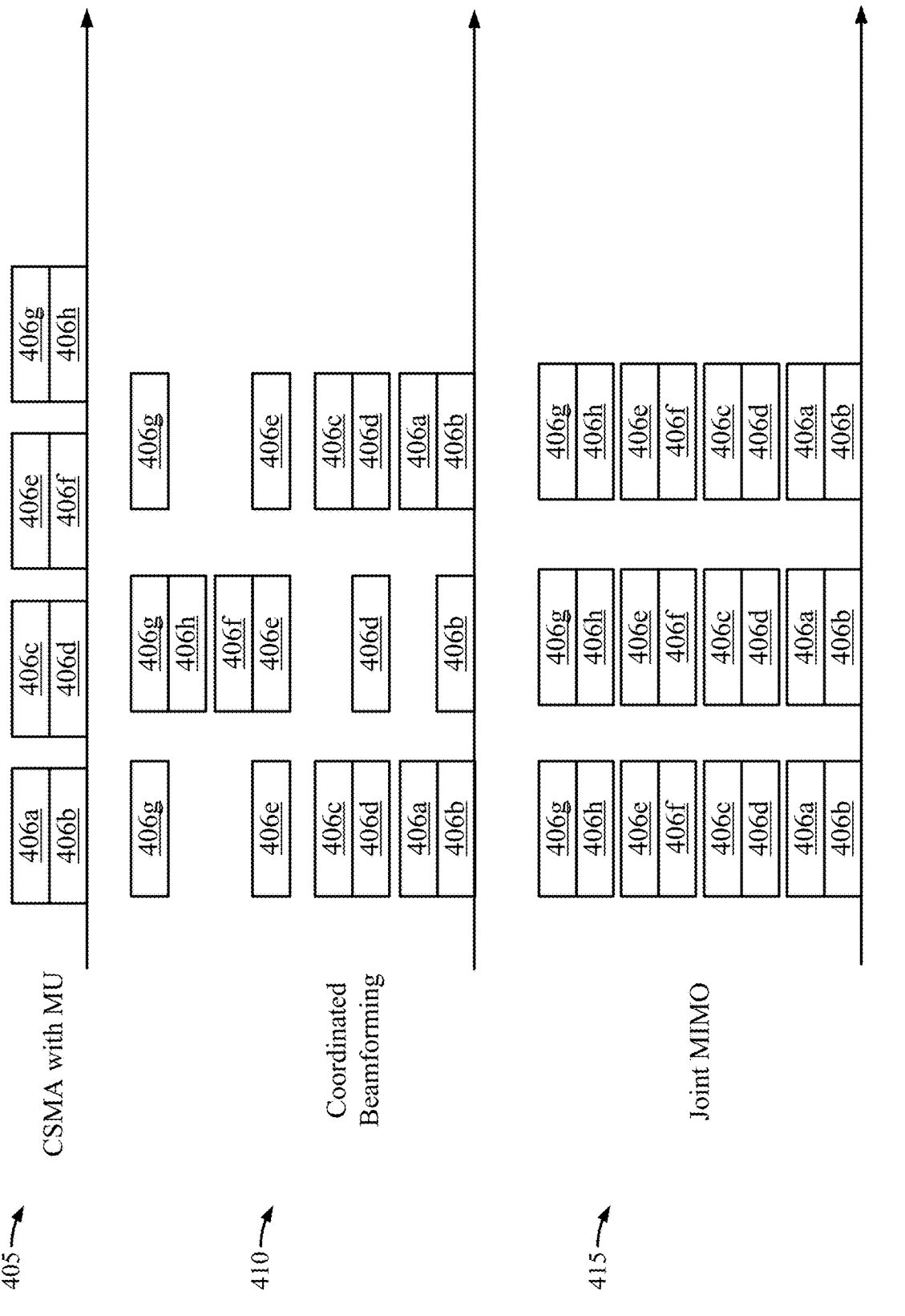
FIG. 4B illustrates exemplary approaches to arbitrating a wireless medium, in accordance with certain aspects of the present disclosure.

FIG. 4B shows three exemplary approaches to arbitrating the wireless medium with the communications system 400. Approach 405 uses carrier sense media access (CSMA) to perform single BSS multi-user transmissions. For example, each of transmissions 420*a-d* may be performed by the BSSs 402*a-d* of FIG. 4 respectively. The use of traditional CSMA in approach 405 causes the medium to be used by only one BSS at any point in time.

Approach 410 uses coordinated beamforming (COBF). With the coordinated beamforming approach 410, the APs 404*a-d* may coordinate transmissions between their respective BSSs. In some aspects, this coordination may be performed over the wireless medium, or in some aspects, over a back-haul network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 406*a* and AP 404*a* may allow these two devices to exchange data simultaneously with communication with OBSS devices, such as, for example, AP 404*b* and STA 406*d*. In addition, approach 410 provides for non-reuse STAs to be scheduled to transmit concurrently with OBSS devices. For example, STA 406*b*, which is within BSS 402, may be scheduled to communicate simultaneous with communication between AP 404*d* and STA 406*h* of BSS 402*d*. Such simultaneous communication between a non-reuse STA (such as STA 406*b*) and, for example, AP 404*d* may be facilitated by scheduling AP 404*d* to transmit a signal to STA 406*b* simultaneous with AP 404*d*'s transmission to STA 406*h*. For example, AP 404*d* may transmit a null signal for dominant interfering signals to STA 406*b*. Thus, while transmitting a first signal to STA 406*h*, AP 404*d* may simultaneously transmit a signal nulling the first signal to STA 406*b*. Such simultaneous transmission by the AP 404*d* may be provided by selecting individual antenna(s) of a plurality of antennas provided by AP 404*d* for each of the transmissions. Such nulling may create reuse opportunities for otherwise non-reuse STAs. COBF may operate in both DL and UL directions with the APs nulling respective frequencies.

Approach 415 shows an exemplary joint multi-user communication or a distributed MIMO communication across APs 404*a-d* within the BSSs 402*a-d*. With this joint MIMO approach 415, a cluster of APs (such as APs 404*a-d*) may service N 1-SS STAs simultaneously, where N is ~¾ of a total number of antennas across all APs within the cluster. Distributed MIMO communications may coordinate a collection of antennas across the multiple APs within a cluster to transmit to STAs within the cluster. Thus, while traditional MIMO methods allocate transmit antennas within a single BSS to STAs within the BSS, distributed MIMO provides for allocation of transmit antennas outside a BSS to facilitate communications with STAs within the BSS.

In a distributed MIMO communication, a station in one BSS may communicate with one or more APs in another, different BSS. Thus, for example, station 406*a* of BSS 402*a* of FIG. 4 may communicate with AP 404*d*, which is in BSS 402*d*. This communication may occur simultaneously with communication between STA 406*a* and AP 404*a*, the BSS AP of the STA 406*a*. In some aspects of an uplink distributed MIMO communication, the STA 406*a* may conduct one or more uplink communications to AP 404*a* simultaneously with AP 404*d*. Alternatively, a downlink distributed MIMO communication may include AP 404*a* transmitting data to STA 406*a* simultaneously with a transmission from AP 404*d* to STA 406*a*.

Thus, one or more of the aspects described herein may use MIMO in the form of Cooperative Multipoint (COMP, also referred to as e.g. Network MIMO (N-MIMO), Distributed MIMO (D-MIMO), or Cooperative MIMO (Co-MIMO), etc.) transmission, in which multiple access points maintaining multiple corresponding basic service sets, can conduct respective cooperative or joint communications with one or more STAs 406. COMP communication between STAs and APs can used for example, a joint processing scheme, in which an AP associated with a STA and an AP that is not associated with the STA cooperate to engage in transmitting downlink data to the STA and/or jointly receiving uplink data from the STA. Additionally or alternatively, CoMP communication between an STA and multiple APs can use coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 410 or the joint MIMO approach 415, an understanding of channel conditions between an AP and OBSS devices may provide for greater wireless communication efficiency.

Figure 5:
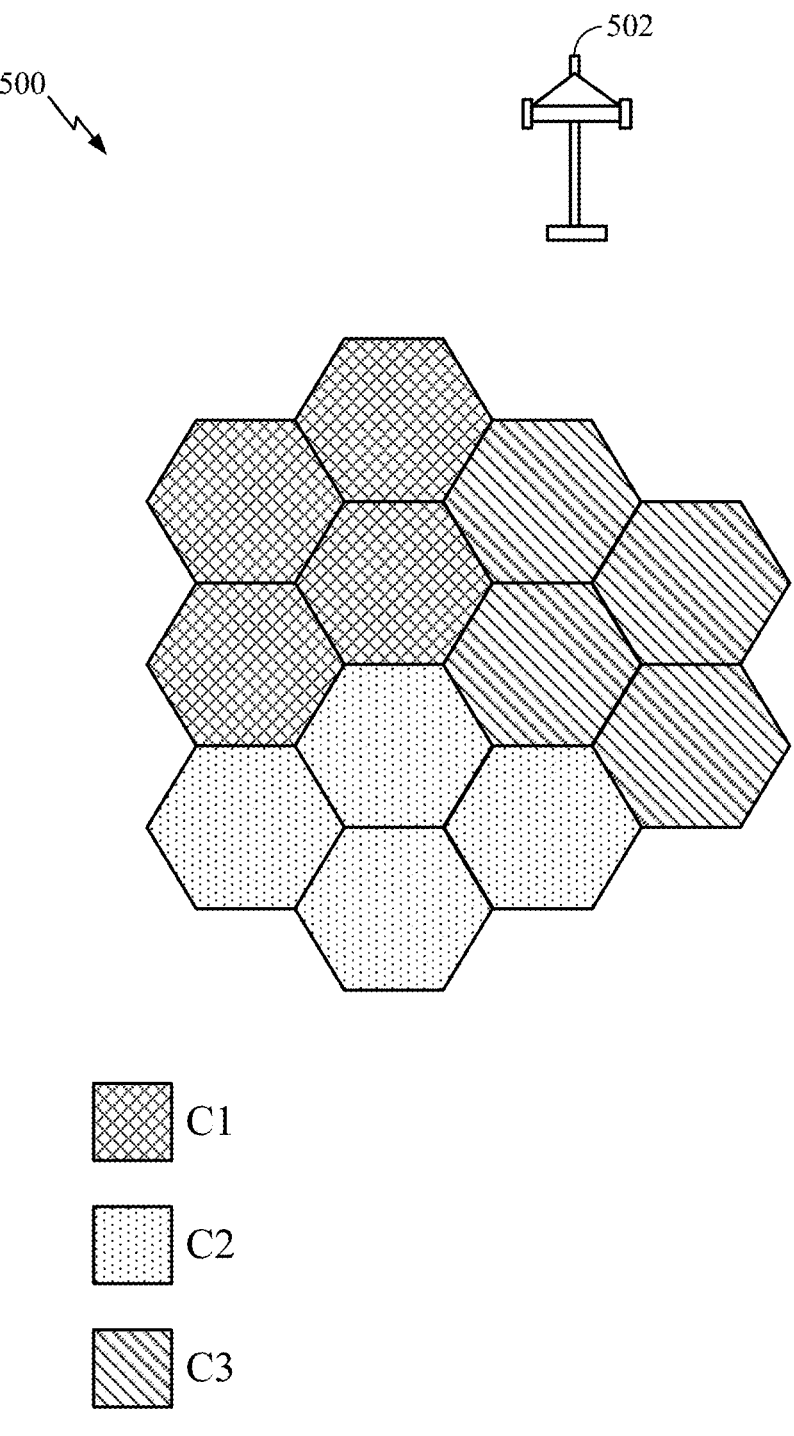
FIG. 5 illustrates a plurality of basic service sets (BSSs) of an exemplary distributed MIMO wireless communication system, in accordance with certain aspects of the present disclosure.
Figure 6A:
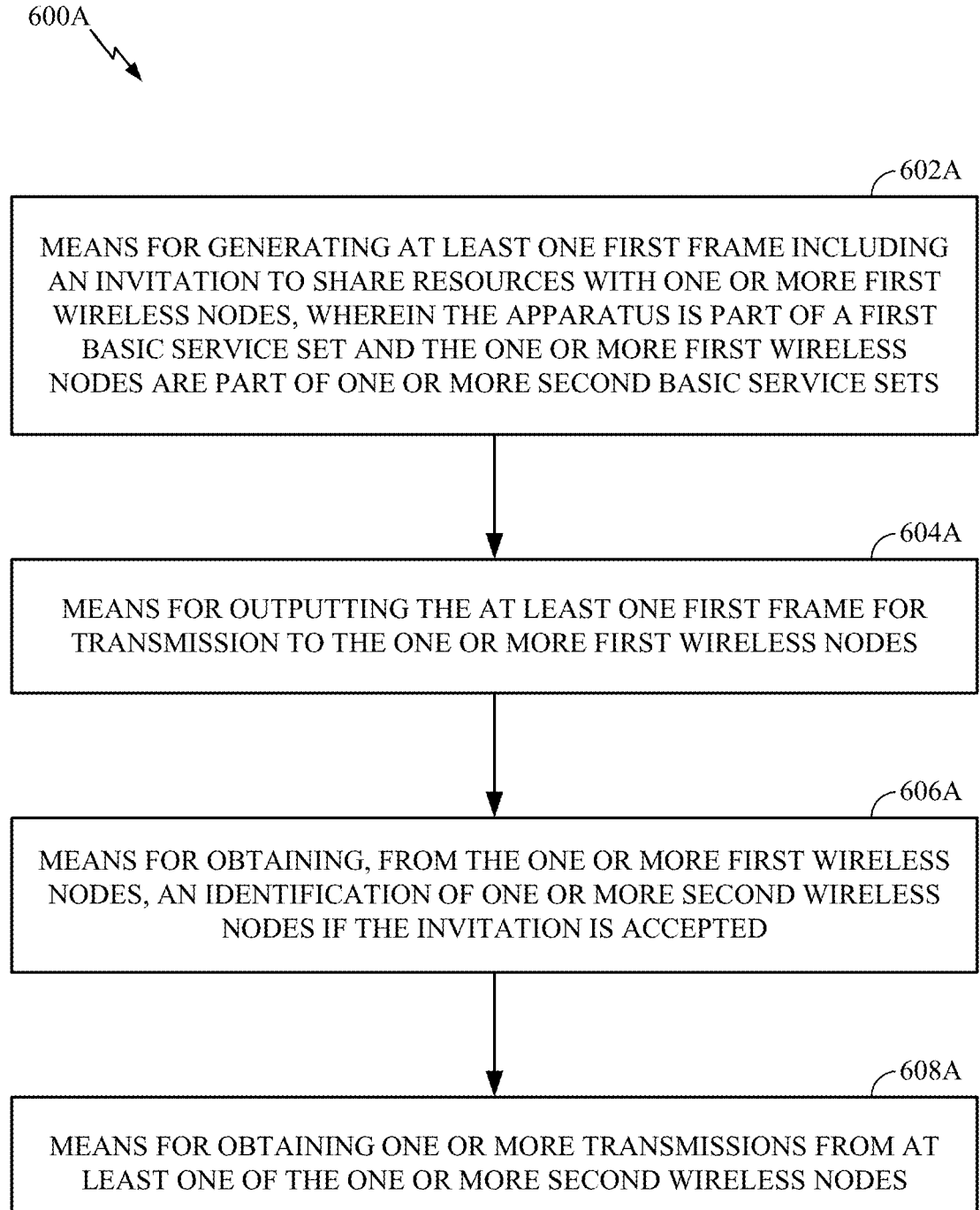
FIG. 6A illustrates example components capable of performing the operations shown in FIG. 6.
Figure 7A:
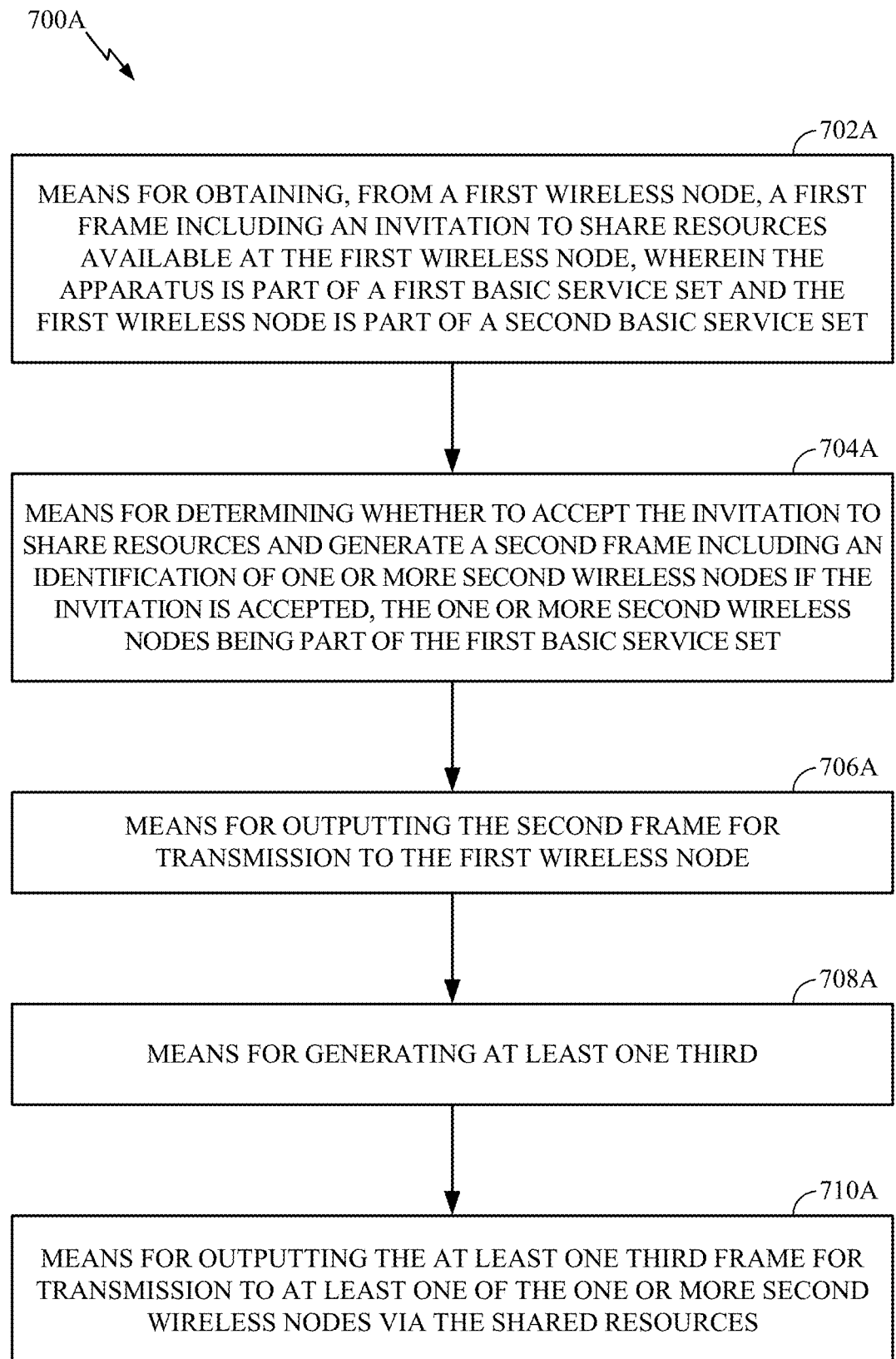
FIG. 7A illustrates example components capable of performing the operations shown in FIG. 7.

FIG. 5 schematically illustrates a plurality of basic service sets (BSSs) 500 of an exemplary distributed MIMO wireless communication system. Each hexagon of FIG. 5 represents an AP and associated STAs, collectively referred to as a BSS. The individual BSSs are grouped into clusters in accordance with certain aspects described herein. In the example schematically illustrated by FIG. 5, a first cluster (C1) comprises four BSSs, a second cluster (C2) comprises four BSSs, and a third cluster (C3) comprises four BSSs. In certain other aspects, a cluster can comprise 2, 3, 4, 5, or any numbers of BSSs and a wireless communication system can comprise one or more clusters (e.g., 2, 3, 4, 5 or other numbers of clusters). A cluster controller 502 is also shown. The cluster controller 502 may comprise an AP (e.g., AP 404a) or another standalone component as described herein. The cluster controller 502 may identify clusters of BSSs based on various BSS parameters.

In certain aspects, to perform distributed MIMO communications, devices within two or more BSSs of a cluster may transmit over a single channel simultaneously (e.g., transmit data from a plurality of access points of the BSS simultaneously via the single channel, or transmit data from a plurality of stations in different BSSs simultaneously to a single AP). In some aspects, a centralized scheduler (not shown) may coordinate transmissions across the clusters C1-C3. For example, coordination may include selecting which devices will transmit simultaneously from multiple BSSs to perform a joint MIMO communication.

Under European Telecommunications Standard Institute (ETSI) regulations, wireless communication systems are generally required to use clear channel assessment (CCA) or listen-before-talk (LBT) before allowing access to the wireless network. Generally, two different access modes are allowed in such wireless communication systems: "frame-based" access mode and "load-based" access mode. To use coordinated access in an unlicensed spectrum, it is generally desirable for a device on the wireless network to use a safe or allowed mechanism for ignoring same-network deferral while honoring LBT toward other devices on the wireless network. A similar issue arises with licensed assisted access (LAA) systems, which are bound to a fixed frame structure. However, in wireless communication systems which are not bound to a fixed frame structure (e.g., WiFi), a more flexible and/or efficient solution may be used. Certain aspects described herein advantageously provide a way to enable reuse (e.g., STAs able to be served simultaneously without having to be nulled) by synchronizing the physical layer convergence procedure (PLCP) protocol data unit (PPDU) start time, which may be seen as a forced collision. In certain such aspects, the timing scheme is configured so that energy detect (ED) or power detect (PD) operations do not trigger within the same wireless network at the start of a frame (e.g., having a standard that defines requirements for CCA timing and synchronization).

For CoBF, an AP (e.g., AP 404a) may serve its own STAs (e.g., STA 406a and STA 406b), and use under-utilized antennas to send null (e.g. a null beam) to outer BSS (OBSS) non-reuse STAs to reduce interference. Thus, increasing the number of AP antennas is key to improving CoBF opportunities. There may be no need for an AP to send nulls to OBSS reuse STAs as they are not positioned in such a manner as to be vulnerable to interference from the AP, as described. In some cases, the communication system as described herein may be a managed network where one AP (e.g., AP 404a) has control over the operations of the other APs (e.g., AP 404b, AP 404c, and AP 404d), or may be an unmanaged network where the APs operate independently.

An AP that obtains (e.g., controls) a TXOP becomes may be referred to as the leader AP for that TXOP. The leader AP may be the owner of the TXOP, and may allow other APs to join the leader for the CoBF join transmission using the TXOP. The leader AP may invite other APs to join a CoBF transmission during the TXOP with some constraints. For example, the leader AP may identify the non-reuse STAs in its own BSS that are scheduled for that TXOP and may need nulling if other APs transmit during the TXOP. The identity of those STAs may be included in the invite signaling to let other APs know that if they choose to accept the invitation to participate in the CoBF, they should have the capability to send nulls to the identified non-reuse STAs. Thus, the APs that participate in the CoBF transmission during the TXOP may send nulls to the identified non-reuse STAs in the invite signaling. By default, invited APs may schedule only their reuse STAs during the TXOP, but with implementation of CoBF, invited APs are able to schedule their non-reuse STAs as well.

FIG. 6 is a flow diagram of example operations 600 for wireless communication, in accordance with certain aspects of the present disclosure. The operations 600 may be performed by an apparatus such as an AP (e.g., a leader AP).

The operations 600 begin, at block 602, by generating at least one first frame including an invitation to share resources with one or more first wireless nodes (e.g., other APs). In certain aspects, the apparatus is part of a first basic service set and the one or more first wireless nodes are part of one or more second basic service sets. At block 604, the operations 600 continue by outputting the at least one first frame for transmission to the one or more first wireless nodes, and at block 606, obtaining, from the one or more first wireless nodes, an identification of one or more second wireless nodes (e.g., non-reuse STAs of the other APs) if the invitation is accepted. In this case, operations 600 may also include, at block 608, obtaining one or more transmissions (e.g., BFRP frames including sounding information) from at least one of the one or more second wireless nodes.

In certain aspects, the apparatus may also generate at least one fourth frame comprising data for one or more third wireless nodes (e.g., the STAs associated with the apparatus), the one or more third wireless nodes being part of the first basic service set. The apparatus may output the at least one fourth frame for transmission (CoBF transmission) to the one or more third wireless nodes based on the sounding information such that the transmission of the at least one fourth frame comprises a null beam for each of the at least one of the one or more second wireless nodes (e.g., non-reuse STAs of the other APs).

FIG. 7 is a flow diagram of example operations 700 for wireless communication, in accordance with certain aspects of the present disclosure. The operations 700 may be performed by an apparatus such an AP (e.g., a non-leader AP).

The operations 700 begin, at block 702, by obtaining, from a first wireless node (e.g., the leader AP), a first frame including an invitation to share resources available at the first wireless node. In certain aspects, the apparatus may be part of a first basic service set and the first wireless node is part of a second basic service set. At block 704, the apparatus may determine whether to accept the invitation to share resources and generate a second frame including an identification of one or more second wireless nodes (e.g., the non-reuse STAs associated with the apparatus) if the invitation is accepted, the one or more second wireless nodes being part of the first basic service set. At block 706, the apparatus may output the second frame for transmission to the first wireless node. At block 708, the apparatus may generate at least one third frame comprising data, and at block 710, output the at least one third frame for transmission (e.g., CoBF transmission) to at least one of the one or more second wireless nodes via the shared resources.

FIG. 8 is a flow diagram of example operations 800 for wireless communication, in accordance with certain aspects of the present disclosure. The operations 800 may be performed by an apparatus such as a STA.

The operations 800 begin, at block 802, by obtaining, from a first wireless node (e.g., AP 404a), a first frame, and at block 804, determining first sounding information based on the first frame, and generating a second frame comprising the first sounding information. At block 806, the apparatus outputs the second frame for transmission. At block 808, the apparatus obtains, after outputting the second frame for transmission, a third frame from a second wireless node (e.g., AP 404c), wherein the first wireless node and the second wireless node are part of different basic service sets. At block 810, the apparatus determines second sounding information based on the third frame, and generates a fourth frame comprising the second sounding information. At block 812, the apparatus outputs the fourth frame for transmission.

In certain aspects, the apparatus may also obtain a fifth frame (e.g., during CoBF transmission) based on the first sounding information or the second sounding information. In some cases aspects, the fifth frame may be obtained, from the first wireless node, based on the first sounding information, the apparatus being part of the same basic service set as the first wireless node. In other cases, the fifth frame may be obtained, from the second wireless node, based on the second sounding information, the apparatus being part of the same basic service set as the second wireless node. In certain aspects, the apparatus may obtain a sixth frame comprising a request for acknowledgement, generate a seventh frame comprising an indication of whether the fifth frame was successfully obtained in response to the request for acknowledgement, and output the seventh frame for transmission. The operations described with respect to FIGS. 6-8 are described in more detail with respect to FIGS. 9-13.

FIG. 9 illustrates multiple phases of an example CoBF protocol 900, in accordance with certain aspects of the present disclosure. As illustrated, phase one involves communications between multiple APs (AP 404a, AP 404b, and AP 404c) to learn about each other's candidate STAs and make scheduling decisions. This is then followed by phase two involving a multi-BSS sounding procedure for each AP to obtain sounding information from STAs (e.g., STAs 406a-f) receiving DL transmissions during the TXOP, allowing each AP to transmit to their respective STAs and send nulls to non-reuse STAs of other APs. This then followed by phase three involving DL CoBF transmissions and corresponding acknowledgements.

Figure 10:
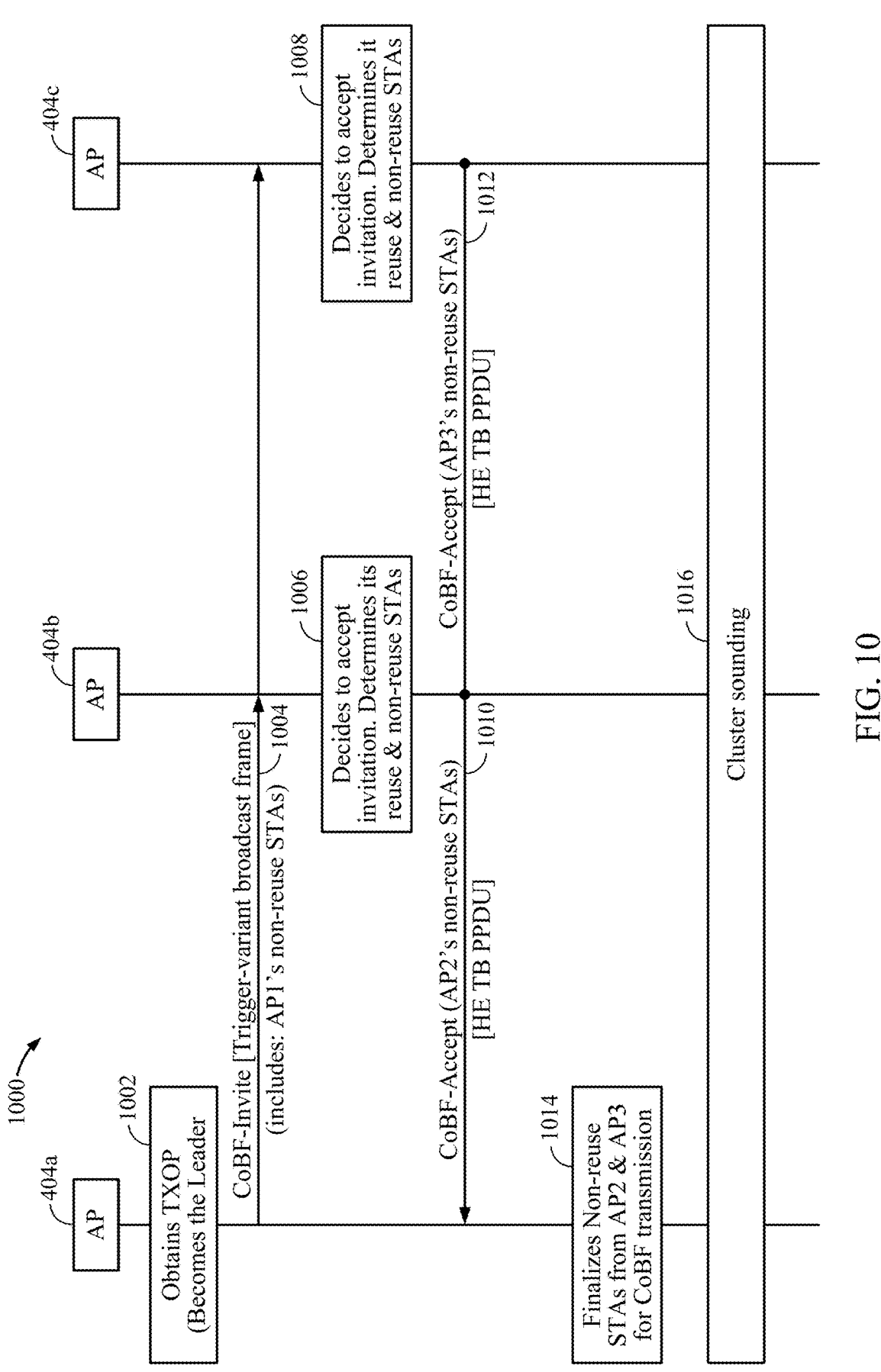
FIG. 10 illustrates example CoBF invitation and response communications, in accordance with certain aspects of the present disclosure.

FIG. 10 illustrates example CoBF invitation and response communications 1000, in accordance with certain aspects of the present disclosure. As illustrated, the AP 404A may be the leader AP as it has obtained and controls the TXOP at block 1002. At block 1004, AP 404a may send a CoBF invite message to AP 404a and AP 404b, which may be a trigger variant broadcast frame. The CoBF invite message may indicate the non-reuse STAs of AP 404a, allowing AP 404b and AP 404c to know whether they can participate in CoBF during the TXOP. At blocks 1006 and 1008, AP 404B and AP 404C then decide whether to accept the invitation for CoBF, and determine their respective reuse and non-reuse STAs. At blocks 1010 and 1012, AP 404B and AP 404C may then send CoBF accept messages to AP 404a, indicating their respective non-reuse STAs to AP 404a. The CoBF accept messages may be sent as a high efficiency (HE) trigger-based (TB) physical layer convergence procedure (PLCP) protocol data unit (PPDU). At block 1014, AP 404a may then select all or some of the non-reuse STAs of AP 404b and AP 404c to participate in the CoBF transmission during the TXOP based on its own available spatial dimensions and ability to NULL the non-reuse STAs during the CoBF transmission. This is then followed by cluster sounding procedure at block 1016, as described in more detail with respect to FIG. 11.

Figure 11:
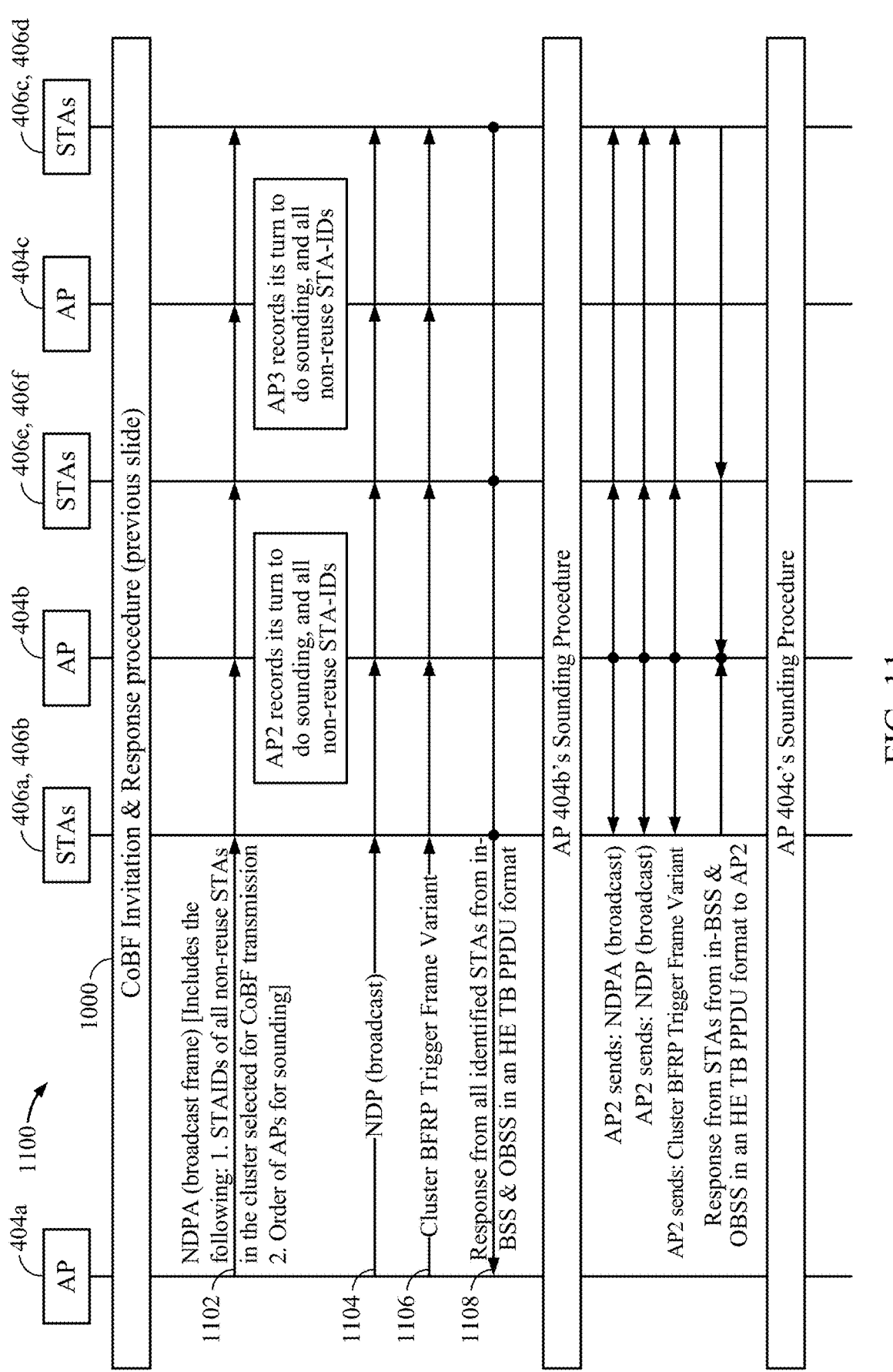
FIG. 11 illustrates an example sounding procedure, in accordance with certain aspects of the present disclosure.

FIG. 11 illustrates an example sounding procedure 1100, in accordance with certain aspects of the present disclosure. At block 1102, the AP 404a may send a null data packet announcement (NDPA) broadcast frame and include the identification of the non-reuse STAs that are selected by AP 404a to participate in the CoBF transmission, and also, the order that the APs (e.g., AP 404b and AP 404c) can participate in sounding operations. AP 404b and AP 404c may record (e.g., save in memory) their respective turns to participate in sounding operations and the identification of the non-reuse STAs indicated in the NDPA frame. At block 1104, AP 404a transmits a null data packet (NDP) broadcast frame, and at block 1106, a cluster beamforming report poll (BFRP) trigger frame to trigger transmissions of sounding information. At block 1108, the STAs of AP 404a and non-reuse STAs of AP 404b and AP 404c may transmit the sounding information to AP 404a in an HE TB PPDU format, as illustrated. Similar to AP 404a, AP 404b and AP 404c may then perform their respective sounding procedures in accordance with the order indicated by AP 404a in the NDPA broadcast frame, as illustrated.

Figure 12:
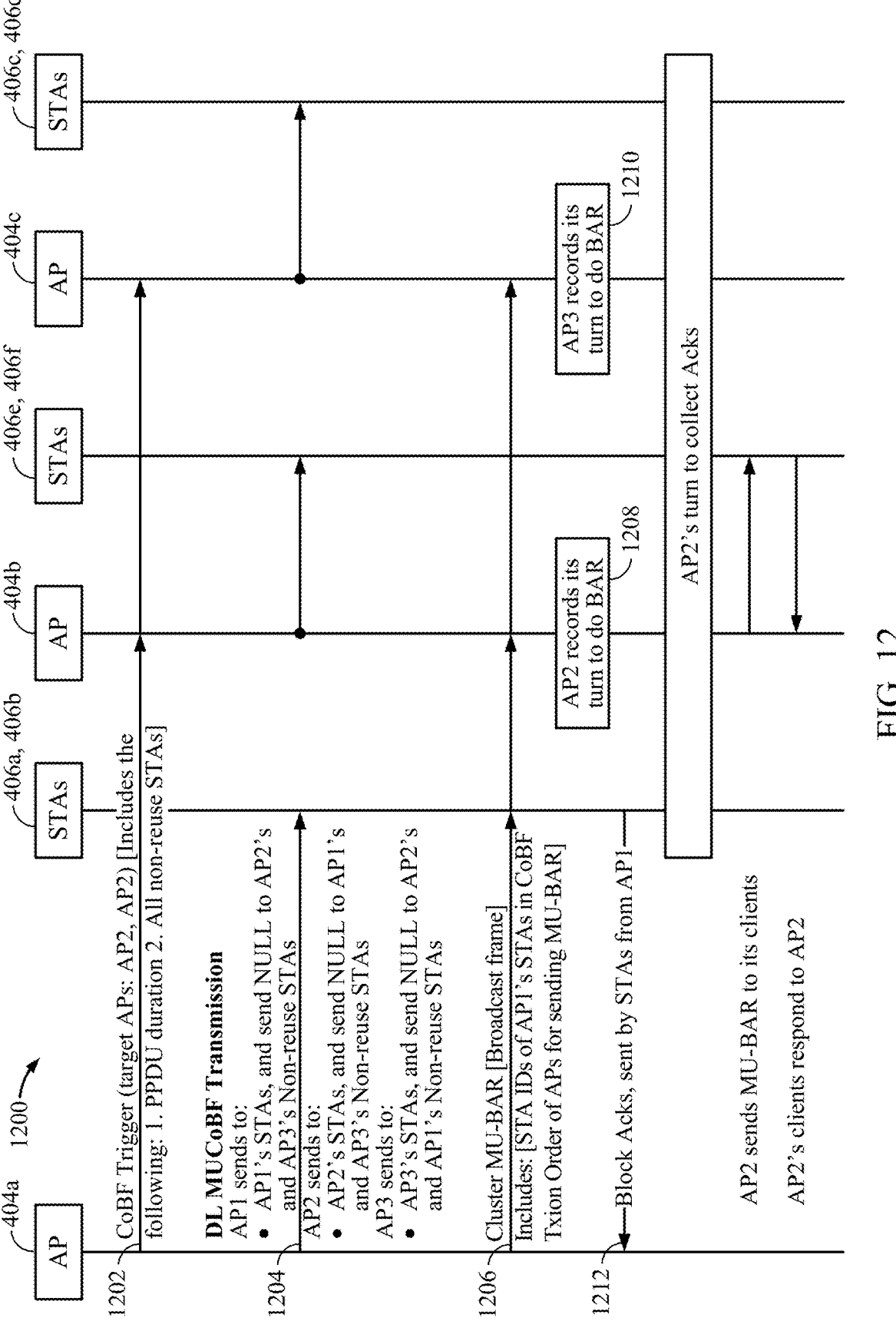
FIG. 12 illustrates example CoBF transmissions and acknowledgements, in accordance with certain aspects of the present disclosure.

FIG. 12 illustrates example CoBF transmissions and acknowledgements 1200, in accordance with certain aspects of the present disclosure. At block 1202, AP 404c may transmit a CoBF trigger frame to AP 404b and AP 404c to trigger a DL multi-user (MU) CoBF transmission. The CoBF trigger frame may include an indication of the PPDU duration for the MU CoBF transmission and the identification of the non-reuse STAs. At block 1204, MU CoBF transmissions are sent from AP 404a, AP 404b, and AP 404c during the TXOP, as illustrated. For example, AP 404a may send data to AP 404a's STAs while also sending null to the non-reuse STAs of AP 404b and AP 404c, based the sounding information, to reduce interference to the non-reuse STAs of AP 404b and AP 404c. Similarly, AP 404b may send data to AP 404b's STAs while also sending null to the non-reuse STAs of AP 404a and AP 404c to reduce interference to the non-reuse STAs of AP 404a and AP 404c. Similarly, AP 404c may send data to AP 404c's STAs while also sending null to the non-reuse STAs of AP 404a and AP 404b to reduce interference to the non-reuse STAs of AP 404a and AP 404b.

At block 1206, AP 404a may send an MU block acknowledgment request (BAR) broadcast frame to request block acknowledgment (BA) of the CoBF transmission from AP 404a's STAs. The BAR broadcast frame may also indicate to AP 404b and AP 404c an order to perform acknowledgement procedures (e.g., sending their respective MU BARs to their respective STAs). At blocks 1208 and 1210, AP 404b and AP 404c may record their respective orders, and at block 1212, the STAs of AP 404a may send their BAs, as illustrated. AP 404b and AP 404c then perform their respective acknowledgement operations in a similar manner and in accordance with the order indicated by AP 404a, as illustrated.

Figure 13:
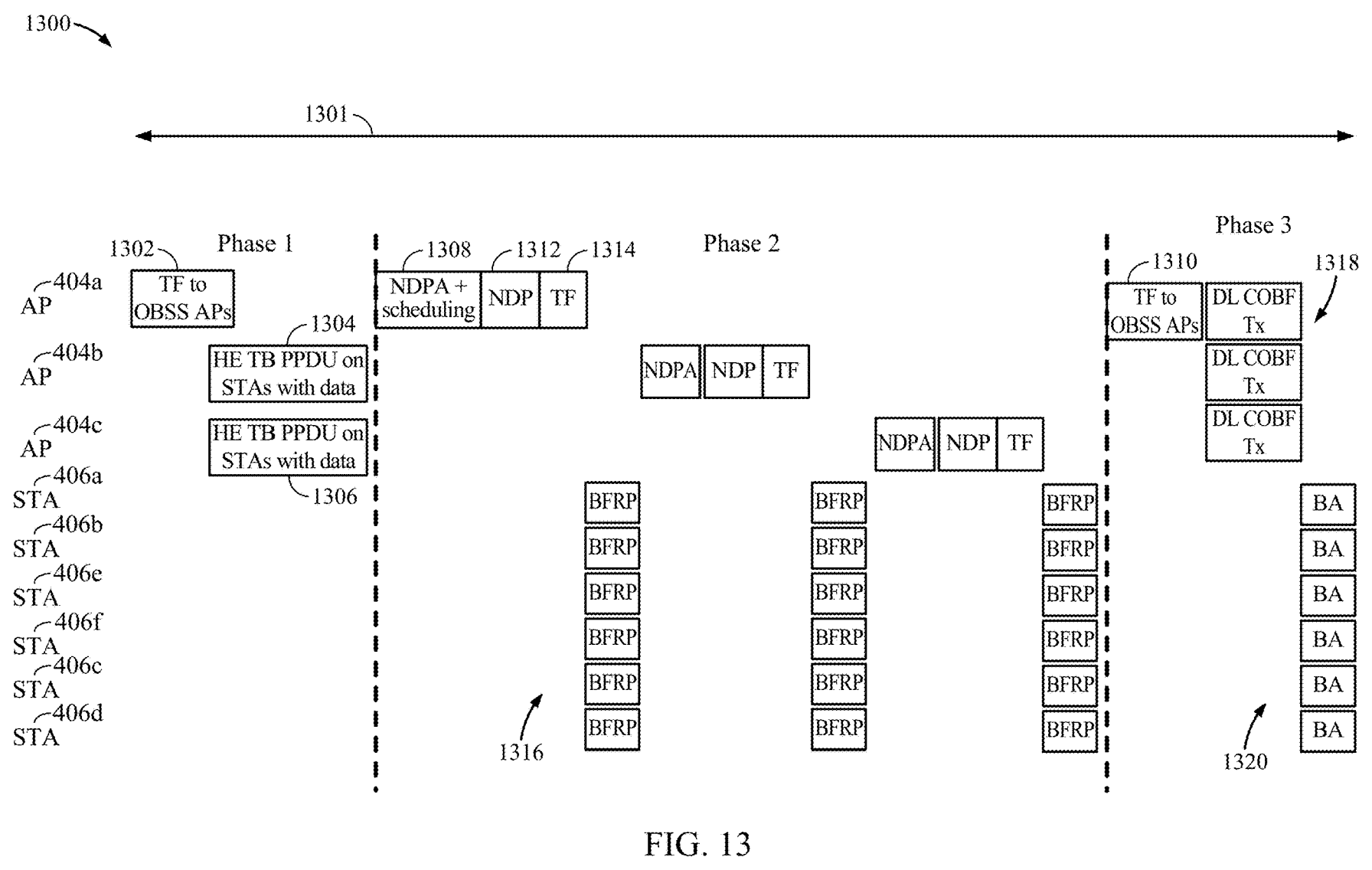

FIG. 13 illustrates a communication protocol 1300 performed during a transmission opportunity 1301, in accordance with certain aspects of the present disclosure. AP 404a may obtain the TXOP and send a trigger frame 1302 to selected OBSS APs (AP 404b and AP 404c) and receive an indication of their candidate STAs for DL CoBF, as described previously. The trigger frame 1302 may include the selected OBSS APs (e.g. AP 404b and AP 404c), AP 404a's non-reuse STAs to be scheduled (e.g., S1-1 and S1-2), and AP 404*a*'s remaining dimensions after scheduling its own non-reuse and reuse STAs. After receiving the trigger frame 1302, the OBSS APs 404*b* and 404*c* send HE TB PPDU frames 1304 and 1306 indicating their candidate non-reuse STAs for CoBF. The total number of spatial streams (NSS) used by AP 404*b* and AP 404*c* should not exceed AP 404*a*'s remaining dimensions such that AP 404*a* can send nulls to the non-reuse STAs of AP 404*b* and AP 404*c*. AP 404*b* and AP 404*c* may also indicate their respective total dimensions to AP 404*a* to allow AP 404*a* to make a final selection of non-reuse STAs that are to participate in CoBF.

AP 404*a* then determines the scheduled STAs by scheduling all its own non-reuse and reuse STAs, and sequentially adding OBSS non-reuse STAs until the total required dimensions of the scheduled STAs is less than every AP's (AP 404*a*, AP 404*b*, and AP 404*c*) total dimensions. It may be assumed that each non-reuse STA costs one dimension for every AP. In the NDPA and scheduling frame 1308, AP 404*a* indicates the scheduled non-reuse STAs of all APs and indicates the NDPA start timing per OBSS AP. This is followed by an NDP frame 1312 and trigger frame 1314 to solicit the transmission of sounding information in the BFRP frames 1316 from the STAs, as illustrated. After receiving the NDPA and scheduling frame 1308, each AP also sends their respective NDPA, NDP, and trigger frame to schedule and solicit the BFRP from all non-reuse STAs in accordance with the timing set by AP 404A in a similar manner.

After the sounding procedures in phase two are complete, AP 404*a* sends a trigger frame 1310 in phase three to initiate and synchronize DL CoBF transmissions. After receiving the trigger frame 1310, each AP transmits DL CoBF transmissions 1318 to its own non-reuse STAs and simultaneously nulls non-reuse STAs of other APs. Each AP is free to add its own reuse STAs to the DL CoBF transmission if spatial dimensions are still available at the AP to do so. In certain aspects, resources may be indicated for the uplink (UL) BA per STA in the NDPA and scheduling frame 1308, allowing for the simultaneous transmission of BAs 1320 from the STAs in phase three, as illustrated.

Example Techniques for Setting a Transmission Opportunity Length for Distributed MIMO To reduce the adverse impact of the overhead on the transmission availability during the transmission opportunity 1301 for distributed MIMO networks, the transmission opportunity duration limit (transmission opportunity limit) may be extended. For example, various options may be provided for extending the transmission opportunity limit. For example, a first option may simply generate a fixed transmission opportunity limit of a greater duration than the current 3-4 ms limit. The fixed transmission opportunity limit may be set at 10 ms or any other value greater than 4 ms. Thus, in the first option, the extended transmission opportunity limit may be independent of any reference value and may be simply set as a specific value.

A second option may extend the transmission opportunity limit based on a desired ratio between the extended transmission opportunity limit and a reference value. In some embodiments, the reference value may comprise a transmission opportunity limit for non-distributed MIMO transmissions or any other existing value (e.g., the existing 3-4 ms limit). Additionally, the desired ratio may be a fixed ratio that is greater than 1. For example, the desired ratio may be set at "2× the reference value" regardless of any variables or parameters of the distributed MIMO network or the extended transmission opportunity. According to such a fixed ratio option, the extended transmission opportunity limit may always be a pre-determined ratio of the reference value, regardless of particulars of the given distributed MIMO network or any other variables. The third option may include extending the transmission opportunity limit based on a dynamic ratio in relation to a reference value. As described herein, the reference value may be any existing value associated with the distributed MIMO network or non-distributed MIMO networks (e.g., a transmission opportunity limit in non-distributed MIMO networks).

In the third option, the extended transmission opportunity limit may depend on distributed MIMO scheduling parameter values or any other parameter or value associated with the distributed MIMO network. For example, the dynamic ratio may be adjusted, selected, and/or determined according to a number of APs participating in the transmission opportunity or a number of STAs to which the APs are transmitting data during the transmission opportunity.

In certain aspects, the dynamic ratio may be adjusted, selected, and/or determined based on the non-extended transmission opportunity limit. For example, if the non-extended transmission opportunity limit is 3 ms, the dynamic ration may be "3× the reference value," where the reference value is the non-extended transmission opportunity limit. However, if the non-extended transmission opportunity limit is 4 ms, the dynamic ration may be "2× the reference value," where the reference value is the non-extended transmission opportunity limit.

The first option for extending the transmission opportunity limit may generally establish a fixed extended transmission opportunity limit that replaces the current 3-4 ms transmission opportunity limit. In certain aspects, the fixed transmission opportunity limit may be determined based on an established value stored in one or more of the APs 404*a-d* or the STAs 406*a-h*.

In certain aspects, the fixed transmission opportunity limit may be a range of limits, where the winning or controlling AP (e.g., AP 404*a*) may select the extended transmission opportunity limit from the range of limits. For example, the extended transmission opportunity limit may be fixed at 16 ms or may be available for selection by the AP 404*a* from the range of limits of 10 ms-20 ms. In certain aspects, the stored fixed limit or range of limits may be stored in a memory of one or more of the APs 404*a-d* and STAs 406*a-h* during manufacture. The transmission opportunity limit (or any other parameters of the transmission opportunity) may be determined by the winning AP 404*a*.

The second option for extending the transmission opportunity limit may involve multiplying a regular transmission opportunity limit (or other value) by a fixed amount or multiplier. The fixed multiplier may be an integer or non-integer value. For example, in distributed MIMO transmissions, the winning AP 404*a* may use an extended transmission opportunity limit that is two (2) times the regular transmission opportunity limit, where the regular transmission opportunity limit is for a regular, single BSS network. Thus, if the transmission opportunity limit for the regular, single BSS network is 4 ms, then the extended transmission opportunity limit is 4 ms×2 or 8 ms when used for distributed MIMO transmissions. In certain aspects, the fixed multiplier may be any other integer or non-integer value.

In certain aspects, the fixed multiplier may be specific to a different type of distributed MIMO transmission. For example, the fixed multiplier for joint MIMO transmissions may be set to 2 while the fixed multiplier for COBF transmissions may be set to 4. In certain aspects, the fixed multiplier may be a single value for all distributed MIMO transmissions.

The third option for extending the transmission opportunity limit may multiply the regular transmission opportunity limit (or other value) by a dynamic amount or multiplier. The dynamic multiplier may be selected or determined based on scheduling parameters of the distributed MIMO network. Similar to the fixed multiplier noted above, the dynamic multiplier may be any integer or non-integer value. Additionally, the dynamic multiplier may be determined based on a linear or non-linear function. For example, the dynamic multiplier may be determined via multiplication or logarithmic functions.

The dynamic multiplier for the third option may be determined based on a number of collaborating APs that the winning AP 404a intends to poll at the beginning of the transmission opportunity, as described herein. For example, if the AP 404a is in a communication system with APs 404b-d where each of APs 404b-d will be polled by the AP 404a as being a potential collaborating AP, then the dynamic multiplier may be determined based on the number of APs (e.g., 4=AP 104a, 104b, 104c, and 104d). On the other hand, if the AP 404a only intends to poll APs 404b and 404d, then the number of APs may be 3 (e.g., 3=AP 104a, 104b, and 104d). For example, the multiplier may equal a quantity of APs polled by the winning AP 104a plus 1.

Alternatively, or additionally, the dynamic multiplier for the third option may be determined based on a number of actual collaborating APs. The number of actual collaborating APs may include only those APs that intend to transmit data to one or more STAs during the current transmission opportunity. Thus, if the AP 404a polls each of the APs 404b-d but only APs 404b and 404d (along with AP 404a) intend to transmit data during the transmission opportunity, then the dynamic multiplier may be set to three.

In certain aspects, the dynamic multiplier may change as the winning AP 404a polls the other APs and received information regarding which APs will be transmitting during the transmission opportunity. For example, the dynamic multiplier may be 4 when the AP 404a polls each of the APs 404b-d but the dynamic multiplier may change to three when the AP 404a receives information indicating that only APs 404a, 404b, and 404d will be transmitting data during the transmission opportunity. Accordingly, the transmission opportunity limit may generally only be reduced when it is dynamically changed.

In certain aspects, the dynamic multiplier may be updated using a contention free-end (CF-end) frame or message or any other message. Furthermore, in certain aspects, the winning AP 404a initiates the COBF transmission opportunity with a regular (e.g., not extended) transmission opportunity limit, for example at a single user (e.g., single BSS) transmission opportunity limit, and sets the network allocation vector (NAV) period according to the regular transmission opportunity limit. The NAV period corresponds to a period of time during which transmissions are to be deferred by STAs to reduce interference with other communications. Once the COBF scheduling is determined by the winning AP 404a, the winning AP 404a may update the transmission opportunity limit based on one or more of the methods described herein. In updating the transmission opportunity limit, the winning AP may request that each of the APs 404b-d extend the NAV in following frames to cover the end of the updated transmission opportunity limit.

The dynamic multiplier for the third option may be determined based on a number of STAs that will receive transmissions from the APs during the transmission opportunity. For example, if the AP 404a intends to transmit data to (e.g., currently has data buffered for) STA 406a and AP

404b intends to transmit data to STA 406c, then the number of STAs that will receive transmissions from the APs is two.

In certain aspects, the dynamic multiplier may be directly based on the numbers of STAs that receive data transmissions during the transmission opportunity. For example, if nine STAs will receive data transmissions during the transmission opportunity, then the dynamic multiplier may be set to three. In certain aspects, the dynamic multiplier may be based on a number of STAs to which the winning AP 404a intends to transmit data (e.g., for which the AP 404a has buffered data).

In certain aspects, the winning AP 404a may select a first dynamic multiplier to be communicated to the corresponding APs 404b-d and STAs 406a-h, for example, based on the total number of STAs to which data is expected to be transmitted. If the first dynamic multiplier is reduced after the first dynamic multiplier is transmitted by the AP 404a, then the AP 404a may truncate the transmission opportunity accordingly and indicate the truncated duration to the APs 404b-d and STAs 406a-h. On the other hand, if the first dynamic multiplier is increased after the first dynamic multiplier is transmitted by the AP 404a, then the winning AP 404a may expand the transmission opportunity accordingly and indicate the expanded duration to the APs 404b-d and STAs 406a-h.

The dynamic multiplier for the third option may be determined based on an actual duration of a multi-BSS sounding. For example, if the multi-BSS sounding duration is three times as long as a single BSS sounding duration, then the multiplier may be set to three. In certain aspects, the multi-BSS sounding duration may be the basis for the multiplier when the AP 404a only schedules STAs to which the AP 404a will transmit data. In certain aspects, the winning AP 404a may select a first dynamic multiplier for communication to the corresponding APs and STAs, for example, based on the total number of STAs to which data is expected to be transmitted. If the first dynamic multiplier is reduced after the first dynamic multiplier is transmitted by the AP 404a, then the winning AP 404a may truncate the transmission opportunity accordingly and indicate the truncated duration to the APs 404b-d and the STAs 406a-h. On the other hand, if the first dynamic multiplier is increased after the first dynamic multiplier is transmitted by the AP 404a, then the winning AP 404a may expand the transmission opportunity accordingly and indicate the expanded duration to the APs 404b-d and the STAs 406a-h.

In certain aspects, the winning AP 404a may indicate an updated transmission opportunity duration or limit in a new dedicated frame or any existing frame in the transmission opportunity. The updated transmission opportunity duration (e.g., length) or limit may be indicated to one or more STAs such that, for example, the STAs know when to transition to an idle state. For example, the AP 404a may use a first transmitted NDPA and scheduling frame to indicate any updates to transmission opportunity limits. Such an indication may provide for scheduled STAs being informed of updated parameters for the transmission opportunity so that they awake during the transmission opportunity and not after the transmission opportunity if they miss the CF-end or similar message due to being in a sleep or low-power state. In certain aspects, the winning AP 404a may use the CF-end message or frame to indicate to legacy devices that a corresponding NAV is to be updated when the legacy devices may not understand the various signaling described above that occurs during the transmission opportunity. In certain aspects, the extended transmission opportunity limits may be generated by the winning or controlling AP 404a according to one or more of the options identified herein.

In addition to extending the transmission opportunity limit, other incentives (e.g., reduce bandwidth usage) may be provided to APs to promote distributed MIMO transmission opportunities. For example, the AP 404a may use different values for contention window minimum and maximum lengths (e.g., $CW_{min}$ and $CW_{max}$) or for arbitration inter-frame spacing numbers (AIFSN) than the corresponding values when not using distributed MIMO transmission opportunities. The smaller CW values may convince APs to access the transmission opportunities over transmission opportunities with larger CW values. The reduced CW values provides the APs using the transmission opportunity more chances to serve their respective STAs. By varying the values used, the AP 404a that is controlling and/or initiating the distributed MIMO transmission opportunities may make the distributed MIMO transmission opportunities more desirable than non-distributed MIMO transmission opportunities. For example, the $CW_{min}$, $CW_{max}$, and AIFSN may be smaller in distributed MIMO networks as compared to non-distributed MIMO networks. For example, one of the $CW_{min}$ and $CW_{max}$ is set to 5 if the winning AP 404a initiates a distributed MIMO transmission opportunity.

In certain aspects, the values of value $CW_{min}$, $CW_{max}$, and AIFSN (or any other parameters) may be dynamic based on one or more parameters of the distributed MIMO networks and/or transmission opportunity. For example, if the distributed MIMO transmission involves three collaborating APs, then the value for $CW_{min}$ may be set to 1/X or 1/3 a regular $CW_{min}$ value. Similarly, the value of the parameter may be dynamic based on the transmission opportunity limit or a number of STAs that will receive data during the transmission opportunity. In certain aspects, the options for extending transmission opportunity limits in distributed MIMO networks and added incentives for initiating distributed MIMO transmissions may apply to both managed and unmanaged distributed MIMO networks and/or protocols.

At least one benefit of extending the transmission opportunity limit and providing additional incentives is that throughput of distributed MIMO networks is increased and more data is transmitted during the transmission opportunities. Additionally, the overhead for the extended transmission opportunities stays substantially the same as with non-extended transmission opportunities, thus increasing the ratio of data transmission to overhead communications.

Figure 14:
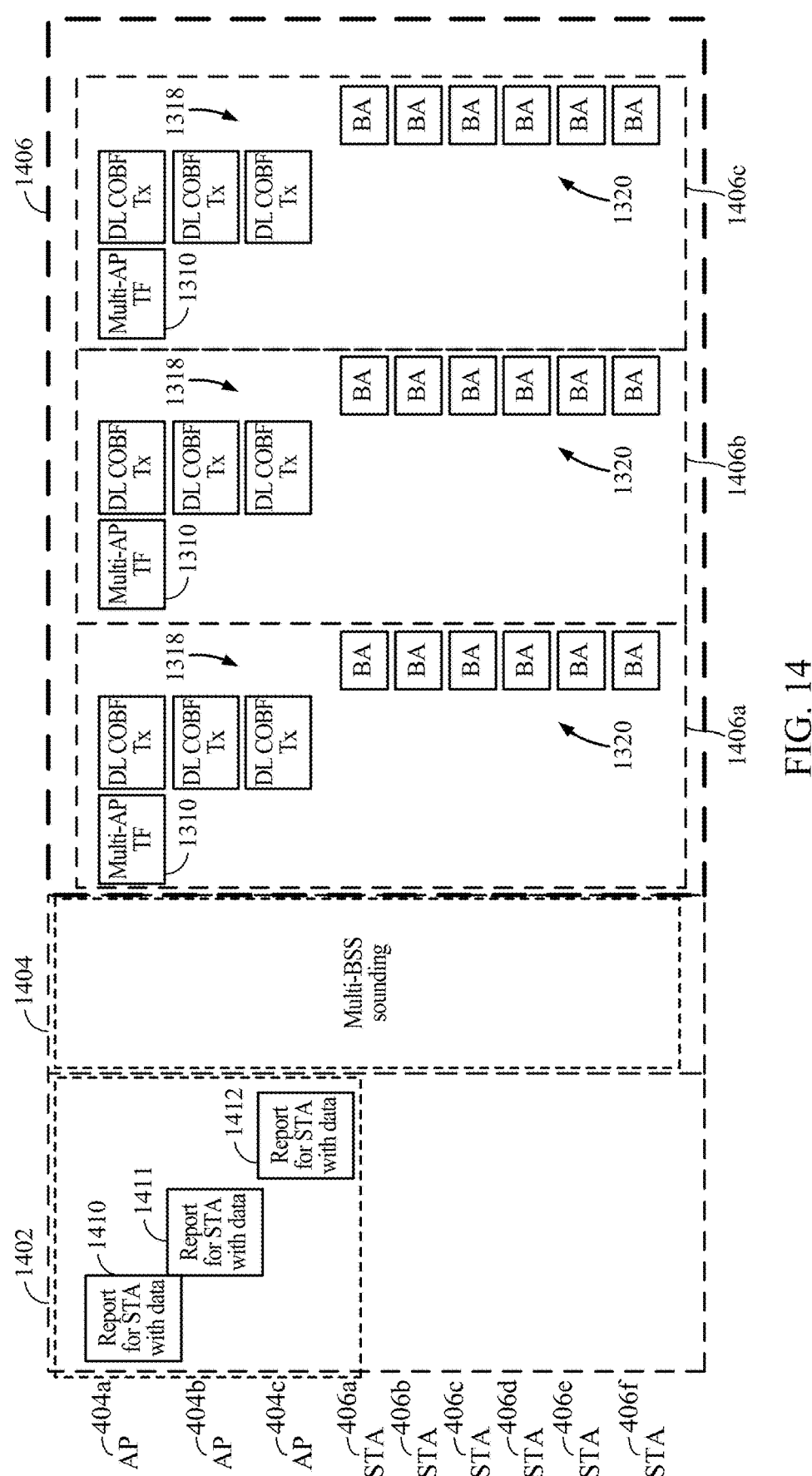
FIG. 14 illustrates an example communication option in an exemplary downlink coordinated beam forming extended transmission opportunity, in accordance with certain aspects of the present disclosure.

FIG. 14 schematically illustrates an example communication option in an exemplary downlink coordinated beam forming extended transmission opportunity 1400, in accordance with certain aspects of the present disclosure. The transmission opportunity 1400 may include three different phases during which one or more APs 404a-c may communicate with each other and with corresponding STAs 406a-f. Each of the APs 404a-c may apply for or request control of transmissions within the wireless communication system. Any one or more methods may be used to select and/or identify the AP that is designated the controlling or winning AP (e.g., first to request, random selection, geographic position, etc.). The winning AP may then have control over the transmission opportunity 1400. In certain aspects, the winning AP may be AP 404a. After the AP 404a wins control of the transmission opportunity 1400, the AP 404a may initiate DL COBF transmissions in the extended transmission opportunity 1400 over three phases. While the transmission opportunity 140000 relates to DL COBF transmissions, the discussions herein may pertain to any type of communication that may occur in transmission opportunities.

The first phase 1402 may correspond to a candidate STA identification period, and similar messages may be included in the first phase 1402. During the first phase 1402, the winning AP (e.g., AP 104a) may poll OBSS APs 404b-c (e.g., the APs for other BSSs) for their candidate STAs having buffered DL data. Additionally, each of the APs 404a-c may generate and transmit a report identifying STAs for which the APs 404a-c have data to be transmitted. The AP 404a may generate the report 1410 reporting or identifying STAs for which the AP 404a has data. Similarly, the AP 104b may generate the report 1411 reporting or identifying STAs for which the AP 104b has data and the AP 404c may generate the report 1412 reporting or identifying STAs for which the AP 404c has data. Based on the received information and/or identifications, the winning AP, AP 404a, may determine which STAs are to be scheduled for communication during the transmission opportunity 1400. In certain aspects, the winning AP 404a may determine an extended transmission opportunity limit based on one or more of the total number of APs that will transmit data and the total number of STAs that will receive data. In some embodiments, the extended transmission opportunity limit of the transmission opportunity 1400 may be longer than the transmission opportunity limit of the transmission opportunity for the communications previously described with respect to FIG. 13.

The second phase 1404 may correspond to a multi-BSS sounding period, similar to the second phase described with respect to FIG. 13. During the second phase 1404, the winning AP 404a may coordinate multi-BSS sounding as described herein. In certain aspects, as described herein, the winning AP 404a may determine an extended transmission opportunity limit based on a duration of the phase 1404 (e.g., based on the multi-BSS sounding duration).

The third phase 1406 may correspond to a DL COBF transmission period, similar to the third phase as described with respect to FIG. 13. However, unlike the third phase of FIG. 13, the third phase 1406 may include three COBF transmission rounds 1406a-c, where each of the APs that intend to transmit to one or more respective STAs transmit at least one DL transmission during each COBF transmission round. The third phase 1406 only shows a single COBF transmission round. Each COBF transmission round may correspond to the communications completed in the third phase of FIG. 13, where each of the collaborating APs may simultaneously begin DL COBF transmissions for their scheduled BSS STAs while nulling OBSS non-reuse STAs.

In the transmission opportunity 1400, there are three COBF transmission rounds 1406a-c. However, any other number (e.g., greater or smaller than three) of rounds may be completed in the transmission opportunity 1400 dependent on the transmission opportunity limit. By increasing the number of transmission rounds, the overhead percentage of the entire transmission opportunity is reduced. Additionally, an amount of overhead per transmission is reduced, as the overhead generally remains the same or incrementally increases (e.g., from the additional trigger frames and acknowledgements). However, a bulk of the overhead (e.g., from the first phase 1402 and the second phase 1404) is maintained regardless of a number of COBF transmission rounds in the third phase 1406. Each transmission round may comprise the winning AP 404a transmitting a multi-AP trigger frame to indicate the APs can begin their COBF transmission. The APs 404 may transmit DL COBF transmissions to their respective STAs while nulling OBSS non-reuse STAs. The STAs may respond with block acknowledgements, and a subsequent COBF transmission round may begin. In certain aspects, as noted above, the first phase 1402 and the second phase 1404 may not be required if the APs already have knowledge of candidate STAs having DL data buffered and/or when details of the metrics of communications between APs and STAs are known.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600, 700, and 800 illustrated in FIGS. 6, 7, and 8 correspond to means 600A illustrated in FIG. 6A, means 700A illustrated in FIG. 7A, and means 800A illustrated in FIG. 8A, respectively.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 252 of the station 120 illustrated in FIG. 2. Means for processing, means for deferring, means for obtaining, means for generating, means for selecting, means for decoding, means for deciding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In certain aspects, the computer program product may include packaging material.

Further, it should be appreciated that modules and/or other appropriate means for performing the methods and techniques described herein can be downloaded and/or otherwise obtained by a station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
at least one processor;
memory coupled with the at least one processor; and
instructions stored in the memory and executable by the
at least one processor to cause the apparatus to:
transmit, via the at least one transceiver, at least one
first frame including an invitation to share resources
with two or more access points, wherein the appa-
ratus is part of a first basic service set and the two or
more access points are part of one or more second
basic service sets that are different from the first
basic service set; and
transmit, via the at least one transceiver, at least one
second frame including an indication of an order of
when each of the two or more access points is to
perform a sounding operation with one or more first
access terminals, each access terminal being served
by a respective one of the two or more access points.

2. The apparatus of claim 1, wherein the instructions
cause the apparatus to further receive, via the at least one
transceiver and from each of the two or more access points,
an identification of a respective one of the one or more first
access terminals if the invitation is accepted.

3. The apparatus of claim 1, wherein the instructions
cause the apparatus to further:
transmit, via the at least one transceiver and to at least one
of the one or more first access terminals, at least one
third frame to trigger transmission of sounding infor-
mation; and
receive, via the at least one transceiver and after trans-
mitting the at least one third frame, the sounding
information from the at least one of the one or more
first access terminals.

4. The apparatus of claim 3, wherein the instructions
cause the apparatus to further transmit, via the at least one
transceiver, at least one fourth frame to one or more second
access terminals based on the sounding information,
wherein the transmission of the at least one fourth frame is
associated with a null beam that points towards each of the
at least one of the one or more first access terminals.

5. The apparatus of claim 3, wherein:
the sounding information is received during a distributed
transmission opportunity; and
the instructions cause the apparatus to further transmit,
via the at least one transceiver, a third frame comprising
an indication that a time duration of the distributed
transmission opportunity has been extended as com-
pared to a time duration of a transmission opportunity
associated with wireless communication by a single
basic service set.

6. The apparatus of claim 1, wherein the instructions
cause the apparatus to further transmit, via the at least one
transceiver, a third frame comprising an indication of an
order in which the two or more access points are to perform
acknowledgement operations.

7. The apparatus of claim 1, wherein the at least one first
frame comprises an indication of one or more second access
terminals that are subject to interference by transmissions
from the two or more access points, the one or more second
access terminals being part of the first basic service set.

8. The apparatus of claim 1, wherein the apparatus is
configured as an access point.

9. A first access point, comprising:
at least one processor;
memory coupled with the at least one processor; and
instructions stored in the memory and executable by the
at least one processor to cause the first access point to:
receive, via the at least one transceiver and from a
second access point, at least one first frame including
an invitation to share resources with the first access
point, wherein the second access point is part of a
first basic service set and the first access point is part
of a second basic service set that is different from the
first basic service set; and
receive, via the at least one transceiver, at least one
second frame including an indication of an order of
when the first access point is to perform a sounding
operation with one or more first access terminals
served by the first access point.

10. The first access point of claim 9, wherein the instruc-
tions cause the first access point to further:
accept the invitation to share the resources; and
based on the invitation being accepted, transmit, via the at
least one transceiver, a third frame for transmission to
the second access point, the third frame including an
identification of the one or more first access terminals,
the one or more first access terminals being part of the
first basic service set.

11. The first access point of claim 9, wherein the instruc-
tions cause the first access point to further:
transmit, via the at least one transceiver, for transmission
to one or more second access terminals, at least one
third frame to trigger transmission of sounding infor-
mation, the transmission being based on the indication
of the order of when the first access point is to perform
the sounding operation, the one or more second access
terminals being part of the first basic service set; and
receive, via the at least one transceiver and from the one
or more second access terminals, the sounding infor-
mation.

12. The first access point of claim 11, wherein the
instructions cause the first access point to further transmit,
via the at least one transceiver, at least one fourth frame for
transmission to the one or more first access terminals based
on the sounding information, wherein the transmission of
the at least one fourth frame is associated with a null beam
that points towards each of the one or more second access
terminals.

13. The first access point of claim 9, wherein the instruc-
tions cause the first access point further to:
receive, via the at least one transceiver, a third frame
comprising an indication of an order of when the first
access point to perform acknowledgement operations;
and
transmit, via the at least one transceiver, after recieving
the indication, a fourth frame.

14. The first access point of claim 9, wherein:
the first frame further comprises an identification of one
or more second access terminals that are subject to
interference by transmissions from the first access
point, the one or more second access terminals being
part of the second basic service set; and
the instructions cause the apparatus to further:
transmit, via the at least one transceiver and to the
second access point, a third frame that includes an
indication of whether the invitation is accepted.

15. An apparatus for wireless communication, comprising:

at least one transceiver;

at least one processor;

memory coupled with the at least one processor; and instructions stored in the memory and executable by the at least one processor to cause the apparatus to:

receive, via the at least one transceiver and from a first access point, a first frame triggering transmission of first sounding information;

transmit, via the at least one transceiver and to the first access point, a second frame including the first sounding information;

receive, via the at least one transceiver and after transmitting the second frame, a third frame from one of two or more second access points that are part of a different basic service set than the first access point, the third frame triggering transmission of second sounding information as part of sounding operation performed in accordance with an indication from the first access point of an order of when the one of two or more second access points is to perform the sounding operation; and transmit, via the at least one transceiver and to the one of the two or more second access points, a fourth frame including the second sounding information.

16. The apparatus of claim 15, wherein the apparatus is part of the same basic service set as the one of the two or more second access points.

17. The apparatus of claim 15, wherein the instructions cause the apparatus to further receive, via the at least one transceiver and after transmitting the second frame and from the first access point, a fifth frame.

18. The apparatus of claim 15, wherein the instructions cause the apparatus further to:

receive, via the at least one transceiver, a fifth frame comprising a request for acknowledgement; and transmit, via the at least one transceiver, a sixth frame comprising an indication of whether the fifth frame was successfully received.

19. The apparatus of claim 15, wherein:

the second frame is transmitted during a distributed transmission opportunity; and the instructions cause the apparatus further to:

receive, via the at least one transceiver, a fifth frame comprising an indication that a time duration of the distributed transmission opportunity has been extended as compared to a transmission opportunity used for transmissions for a single basic service set;

and transition, after receiving the fifth frame, to an idle state.

\* \* \* \* \*